(12) United States Patent
Hare et al.

(10) Patent No.: US 11,715,268 B2
(45) Date of Patent: **\*Aug. 1, 2023**

(54) VIDEO CLIP OBJECT TRACKING

(71) Applicant: Snap Inc., Santa Monica, CA (US)

(72) Inventors: Samuel Edward Hare, Los Angeles, CA (US); Andrew James McPhee, Culver City, CA (US); Tony Mathew, Los Angeles, CA (US)

(73) Assignee: Snap Inc., Santa Monica, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 17/307,354

(22) Filed: May 4, 2021

(65) Prior Publication Data

US 2021/0256773 A1 Aug. 19, 2021

Related U.S. Application Data

(63) Continuation of application No. 16/242,708, filed on Jan. 8, 2019, now Pat. No. 11,030,813.
(Continued)

(51) Int. Cl.
*G06T 19/00* (2011.01)
*G06T 7/70* (2017.01)
(Continued)

(52) U.S. Cl.
CPC ........ *G06T 19/006* (2013.01); *G06F 3/04817* (2013.01); *G06F 3/04845* (2013.01);
(Continued)

(58) Field of Classification Search
CPC ..... G06T 19/006; G06T 7/70; G06T 2200/04; G06T 2200/24; G06F 3/04817;
(Continued)

(56) References Cited

U.S. PATENT DOCUMENTS 5,751,850 A 5/1998 Rindtorff
5,880,731 A 3/1999 Liles et al.
(Continued)

FOREIGN PATENT DOCUMENTS

CA 2887596 A1 7/2015
CN 103443582 A 12/2013
(Continued)

OTHER PUBLICATIONS

"U.S. Appl. No. 16/747,318, 312 Amendment filed Nov. 5, 2021", 7 pgs.
(Continued)

*Primary Examiner* — Grace Q Li
(74) *Attorney, Agent, or Firm* — Schwegman Lundberg & Woessner, P.A.

(57) ABSTRACT

Aspects of the present disclosure involve a system comprising a computer-readable storage medium storing at least one program, and a method for rendering a three-dimensional virtual object in a video clip. The method and system include capturing, using a camera-enabled device, video content of a real-world scene and movement information collected by the camera-enabled device during capture of the video content. The captured video and movement information are stored. The stored captured video content is processed to identify a real-world object in the scene. An interactive augmented reality display is generated that: adds a virtual object to the stored video content to create augmented video content comprising the real-world scene and the virtual object and adjusts, during playback of the augmented video content, an on-screen position of the virtual object within the augmented video content based at least in part on the stored movement information.

20 Claims, 14 Drawing Sheets

Related U.S. Application Data

(60) Provisional application No. 62/725,058, filed on Aug. 30, 2018.

(51) Int. Cl.
*G06F 3/04817* (2022.01)
*G06F 3/04845* (2022.01)
*G06F 3/0488* (2022.01)
*H04N 9/87* (2006.01)
*G11B 27/036* (2006.01)

(52) U.S. Cl.
CPC .............. *G06T 7/70* (2017.01); *G11B 27/036* (2013.01); *H04N 9/8715* (2013.01); *G06F 3/0488* (2013.01); *G06T 2200/04* (2013.01); *G06T 2200/24* (2013.01)

(58) Field of Classification Search
CPC .... G06F 3/04845; G06F 3/0488; G06F 3/011; G06F 3/0304; G06F 3/04815; G06F 3/0346; G11B 27/036; G11B 27/007; G11B 27/031; H04N 9/8715; H04N 5/272; H04L 51/10; H04L 51/18
See application file for complete search history.

(56) References Cited

U.S. PATENT DOCUMENTS

| | | |
|---|---|---|
| 6,020,891 A | 2/2000 | Rekimoto |
| 6,023,270 A | 2/2000 | Brush, II et al. |
| 6,038,295 A | 3/2000 | Mattes |
| 6,223,165 B1 | 4/2001 | Lauffer |
| 6,434,277 B1 | 8/2002 | Yamada et al. |
| 6,772,195 B1 | 8/2004 | Hatlelid et al. |
| 6,842,779 B1 | 1/2005 | Nishizawa |
| 6,980,909 B2 | 12/2005 | Root et al. |
| 7,173,651 B1 | 2/2007 | Knowles |
| 7,342,587 B2 | 3/2008 | Danzig et al. |
| 7,411,493 B2 | 8/2008 | Smith |
| 7,468,729 B1 | 12/2008 | Levinson |
| 7,535,890 B2 | 5/2009 | Rojas |
| 7,636,755 B2 | 12/2009 | Blattner et al. |
| 7,639,251 B2 | 12/2009 | Gu et al. |
| 7,775,885 B2 | 8/2010 | Van et al. |
| 7,859,551 B2 | 12/2010 | Bulman et al. |
| 7,885,931 B2 | 2/2011 | Seo et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson |
| 8,130,219 B2 | 3/2012 | Fleury et al. |
| 8,131,597 B2 | 3/2012 | Hudetz |
| 8,146,005 B2 | 3/2012 | Jones et al. |
| 8,151,191 B2 | 4/2012 | Nicol |
| 8,199,747 B2 | 6/2012 | Rojas et al. |
| 8,332,475 B2 | 12/2012 | Rosen et al. |
| 8,384,719 B2 | 2/2013 | Reville |
| RE44,054 E | 3/2013 | Kim |
| 8,396,708 B2 | 3/2013 | Park et al. |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,553,032 B1 | 10/2013 | Poston |
| 8,559,980 B2 | 10/2013 | Pujol |
| 8,564,621 B2 | 10/2013 | Branson et al. |
| 8,564,710 B2 | 10/2013 | Nonaka et al. |
| 8,570,343 B2 | 10/2013 | Halstead |
| 8,581,911 B2 | 11/2013 | Becker et al. |
| 8,597,121 B2 | 12/2013 | del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,718,333 B2 | 5/2014 | Wolf et al. |
| 8,724,622 B2 | 5/2014 | Rojas |
| 8,730,156 B2 | 5/2014 | Weising et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,874,677 B2 | 10/2014 | Rosen et al. |
| 8,890,926 B2 | 11/2014 | Tandon et al. |
| 8,892,999 B2 | 11/2014 | Nims et al. |
| 8,909,679 B2 | 12/2014 | Root et al. |
| 8,924,250 B2 | 12/2014 | Bates et al. |
| 8,963,926 B2 | 2/2015 | Brown et al. |
| 8,989,786 B2 | 3/2015 | Feghali |
| 8,995,433 B2 | 3/2015 | Rojas |
| 9,031,809 B1 | 5/2015 | Kumar et al. |
| 9,040,574 B2 | 5/2015 | Wang et al. |
| 9,055,416 B2 | 6/2015 | Rosen et al. |
| 9,086,776 B2 | 7/2015 | Ye et al. |
| 9,100,806 B2 | 8/2015 | Rosen et al. |
| 9,100,807 B2 | 8/2015 | Rosen et al. |
| 9,105,014 B2 | 8/2015 | Collet et al. |
| 9,191,776 B2 | 11/2015 | Root et al. |
| 9,204,252 B2 | 12/2015 | Root |
| 9,241,184 B2 | 1/2016 | Weerasinghe |
| 9,256,860 B2 | 2/2016 | Herger et al. |
| 9,298,257 B2 | 3/2016 | Hwang et al. |
| 9,314,692 B2 | 4/2016 | Konoplev |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,430,791 B1 | 8/2016 | Sutton-shearer |
| 9,442,564 B1 | 9/2016 | Dillon |
| 9,443,227 B2 | 9/2016 | Evans et al. |
| 9,460,541 B2 | 10/2016 | Li et al. |
| 9,489,661 B2 | 11/2016 | Evans et al. |
| 9,489,760 B2 | 11/2016 | Li et al. |
| 9,491,134 B2 | 11/2016 | Rosen et al. |
| 9,503,845 B2 | 11/2016 | Vincent |
| 9,508,197 B2 | 11/2016 | Quinn |
| 9,517,403 B1 | 12/2016 | Kim et al. |
| 9,544,257 B2 | 1/2017 | Ogundokun et al. |
| 9,576,201 B2 | 2/2017 | Wu et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,633,447 B2 | 4/2017 | Swaminathan et al. |
| 9,645,394 B2 | 5/2017 | Kinnebrew et al. |
| 9,648,376 B2 | 5/2017 | Chang et al. |
| 9,652,897 B2 | 5/2017 | Osborn et al. |
| 9,697,635 B2 | 7/2017 | Quinn et al. |
| 9,706,040 B2 | 7/2017 | Kadirvel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,789,403 B1 | 10/2017 | Furment et al. |
| 9,792,714 B2 | 10/2017 | Li et al. |
| 9,839,844 B2 | 12/2017 | Dunstan et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,116,598 B2 | 10/2018 | Tucker et al. |

(56) References Cited

U.S. PATENT DOCUMENTS

| | | |
|---|---|---|
| 10,155,168 B2 | 12/2018 | Blackstock et al. |
| 10,173,141 B1 | 1/2019 | Schindler et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,318,034 B1 * | 6/2019 | Hauenstein ............ G06F 3/0412 |
| 10,362,219 B2 | 7/2019 | Wilson et al. |
| 10,387,730 B1 | 8/2019 | Cowburn et al. |
| 10,475,225 B2 | 11/2019 | Park et al. |
| 10,504,266 B2 | 12/2019 | Blattner et al. |
| 10,529,109 B1 | 1/2020 | Chen et al. |
| 10,573,048 B2 | 2/2020 | Ni et al. |
| 10,593,116 B2 | 3/2020 | Egri et al. |
| 10,657,701 B2 | 5/2020 | Osman et al. |
| 10,740,978 B2 | 8/2020 | McPhee et al. |
| 10,990,246 B1 | 4/2021 | Law et al. |
| 11,030,813 B2 | 6/2021 | Hare et al. |
| 11,189,098 B2 | 11/2021 | Hare et al. |
| 11,195,338 B2 | 12/2021 | Mcphee et al. |
| 11,210,850 B2 | 12/2021 | Goodrich et al. |
| 11,232,646 B2 | 1/2022 | Goodrich et al. |
| 11,263,817 B1 | 3/2022 | Goodrich et al. |
| 11,275,252 B2 | 3/2022 | Boriskin et al. |
| 11,308,284 B2 | 4/2022 | Huang et al. |
| 11,443,491 B2 | 9/2022 | Hare et al. |
| 11,501,499 B2 | 11/2022 | Goodrich et al. |
| 2002/0067362 A1 | 6/2002 | Agostino Nocera et al. |
| 2002/0169644 A1 | 11/2002 | Greene |
| 2004/0212630 A1 | 10/2004 | Hobgood et al. |
| 2005/0041842 A1 | 2/2005 | Frakes et al. |
| 2005/0162419 A1 | 7/2005 | Kim et al. |
| 2005/0020661 A1 | 9/2005 | Cordelli |
| 2006/0294465 A1 | 12/2006 | Ronen et al. |
| 2007/0018811 A1 | 1/2007 | Gollu |
| 2007/0096678 A1 | 5/2007 | Melrose |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2008/0078758 A1 | 4/2008 | Shimura et al. |
| 2008/0158222 A1 | 7/2008 | Li et al. |
| 2009/0016617 A1 | 1/2009 | Bregman-amitai et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0160779 A1 | 6/2009 | Crockett et al. |
| 2009/0177976 A1 | 7/2009 | Bokor et al. |
| 2009/0202114 A1 | 8/2009 | Morin et al. |
| 2009/0215536 A1 | 8/2009 | Yee et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0115426 A1 | 5/2010 | Liu et al. |
| 2010/0162149 A1 | 6/2010 | Sheleheda et al. |
| 2010/0203968 A1 | 8/2010 | Gill |
| 2010/0227682 A1 | 9/2010 | Reville et al. |
| 2010/0251101 A1 | 9/2010 | Haussecker et al. |
| 2011/0093780 A1 | 4/2011 | Dunn |
| 2011/0115798 A1 | 5/2011 | Nayar et al. |
| 2011/0129118 A1 | 6/2011 | Hagbi et al. |
| 2011/0148864 A1 | 6/2011 | Lee et al. |
| 2011/0161242 A1 | 6/2011 | Chung et al. |
| 2011/0183732 A1 | 7/2011 | Block et al. |
| 2011/0202598 A1 | 8/2011 | Evans et al. |
| 2011/0239136 A1 | 9/2011 | Goldman et al. |
| 2012/0002014 A1 | 1/2012 | Walsh |
| 2012/0092329 A1 | 4/2012 | Koo et al. |
| 2012/0113106 A1 | 5/2012 | Choi et al. |
| 2012/0120186 A1 | 5/2012 | Diaz et al. |
| 2012/0124458 A1 | 5/2012 | Cruzada |
| 2012/0130717 A1 | 5/2012 | Xu et al. |
| 2012/0194549 A1 | 8/2012 | Osterhout et al. |
| 2012/0206558 A1 | 8/2012 | Setton |
| 2012/0209924 A1 | 8/2012 | Evans et al. |
| 2012/0224773 A1 | 9/2012 | Sweet, III et al. |
| 2013/0021373 A1 | 1/2013 | Vaught et al. |
| 2013/0050258 A1 | 2/2013 | Liu et al. |
| 2013/0103760 A1 | 4/2013 | Golding et al. |
| 2013/0127980 A1 | 5/2013 | Haddick et al. |
| 2013/0141434 A1 | 6/2013 | Sugden et al. |
| 2013/0201187 A1 | 8/2013 | Tong et al. |
| 2013/0223673 A1 | 8/2013 | Davis et al. |
| 2013/0249948 A1 | 9/2013 | Reitan |
| 2013/0257877 A1 | 10/2013 | Davis |
| 2013/0278631 A1 | 10/2013 | Border et al. |
| 2014/0028713 A1 | 1/2014 | Keating et al. |
| 2014/0043329 A1 | 2/2014 | Wang et al. |
| 2014/0055554 A1 | 2/2014 | Du et al. |
| 2014/0078176 A1 | 3/2014 | Kim et al. |
| 2014/0125678 A1 | 5/2014 | Wang et al. |
| 2014/0129343 A1 | 5/2014 | Finster et al. |
| 2014/0176608 A1 | 6/2014 | Boysen et al. |
| 2014/0026741 A1 | 9/2014 | Fein et al. |
| 2014/0321702 A1 | 10/2014 | Schmaistieg |
| 2014/0344762 A1 | 11/2014 | Grasset et al. |
| 2014/0351758 A1 | 11/2014 | Yoshida |
| 2015/0023602 A1 | 1/2015 | Wnuk et al. |
| 2015/0098614 A1 | 4/2015 | Gee et al. |
| 2015/0103183 A1 | 4/2015 | Abbott et al. |
| 2015/0206349 A1 | 7/2015 | Rosenthal et al. |
| 2015/0262029 A1 | 9/2015 | Pirchheim et al. |
| 2015/0264304 A1 | 9/2015 | Chastney et al. |
| 2015/0269783 A1 | 9/2015 | Yun |
| 2015/0301599 A1 | 10/2015 | Miller |
| 2015/0309698 A1 * | 10/2015 | Senderek ............ G06F 3/04842 715/815 |
| 2015/0366527 A1 | 12/2015 | Yu et al. |
| 2016/0025978 A1 | 1/2016 | Mallinson |
| 2016/0054837 A1 | 2/2016 | Stafford |
| 2016/0063600 A1 | 3/2016 | Wuang |
| 2016/0073962 A1 | 3/2016 | Yu et al. |
| 2016/0085773 A1 | 3/2016 | Chang et al. |
| 2016/0109940 A1 | 4/2016 | Lyren et al. |
| 2016/0134840 A1 | 5/2016 | Mcculloch |
| 2016/0171739 A1 | 6/2016 | Anderson et al. |
| 2016/0234149 A1 | 8/2016 | Tsuda et al. |
| 2016/0292917 A1 | 10/2016 | Dorner et al. |
| 2016/0330522 A1 | 11/2016 | Newell et al. |
| 2016/0350967 A1 | 12/2016 | Klassen |
| 2016/0360115 A1 | 12/2016 | Rim |
| 2016/0379418 A1 | 12/2016 | Osborn et al. |
| 2017/0038829 A1 | 2/2017 | Lanier et al. |
| 2017/0039986 A1 | 2/2017 | Lanier et al. |
| 2017/0069134 A1 | 3/2017 | Shapira et al. |
| 2017/0080346 A1 | 3/2017 | Abbas |
| 2017/0087473 A1 | 3/2017 | Siegel et al. |
| 2017/0090747 A1 | 3/2017 | Dash |
| 2017/0103452 A1 | 4/2017 | Hertel et al. |
| 2017/0113140 A1 | 4/2017 | Blackstock et al. |
| 2017/0118145 A1 | 4/2017 | Aittoniemi et al. |
| 2017/0178272 A1 | 6/2017 | Lashkari et al. |
| 2017/0199855 A1 | 7/2017 | Fishbeck |
| 2017/0221272 A1 | 8/2017 | Li et al. |
| 2017/0229153 A1 | 8/2017 | Moore et al. |
| 2017/0235848 A1 | 8/2017 | Van Deusen et al. |
| 2017/0243352 A1 | 8/2017 | Kutliroff et al. |
| 2017/0255450 A1 | 9/2017 | Mullins et al. |
| 2017/0278308 A1 | 9/2017 | Bleiweiss et al. |
| 2017/0287060 A1 | 10/2017 | Choi et al. |
| 2017/0310934 A1 | 10/2017 | Du et al. |
| 2017/0312634 A1 | 11/2017 | Ledoux et al. |
| 2017/0329488 A1 | 11/2017 | Welker et al. |
| 2017/0361225 A1 | 12/2017 | Goslin et al. |
| 2018/0005429 A1 | 1/2018 | Osman et al. |
| 2018/0040166 A1 | 2/2018 | Jayaraj et al. |
| 2018/0047200 A1 | 2/2018 | O'hara et al. |
| 2018/0061072 A1 | 3/2018 | Benezra et al. |
| 2018/0082117 A1 * | 3/2018 | Sharma ............... G06T 19/003 |
| 2018/0082430 A1 | 3/2018 | Sharma et al. |
| 2018/0108179 A1 | 4/2018 | Tomlin et al. |
| 2018/0113587 A1 | 4/2018 | Allen et al. |

(56) References Cited

U.S. PATENT DOCUMENTS

| | | |
|---|---|---|
| 2018/0114365 A1 | 4/2018 | Egri et al. |
| 2018/0115503 A1 | 4/2018 | Baldwin et al. |
| 2018/0122142 A1 | 5/2018 | Egeler et al. |
| 2018/0143748 A1 | 5/2018 | Ahmed et al. |
| 2018/0143950 A1 | 5/2018 | Al-amaouti et al. |
| 2018/0160194 A1* | 6/2018 | Bayliss ............ H04N 21/44016 |
| 2018/0197343 A1 | 7/2018 | Hare et al. |
| 2018/0210628 A1 | 7/2018 | Mcphee et al. |
| 2018/0276882 A1 | 9/2018 | Harviainen et al. |
| 2018/0285647 A1 | 10/2018 | Chen et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2018/0330480 A1 | 11/2018 | Liu et al. |
| 2018/0336714 A1 | 11/2018 | Stoyles et al. |
| 2018/0345129 A1 | 12/2018 | Rathod |
| 2018/0349451 A1 | 12/2018 | O'connell et al. |
| 2019/0001223 A1 | 1/2019 | Blackstock et al. |
| 2019/0004688 A1 | 1/2019 | Bowen |
| 2019/0011703 A1 | 1/2019 | Robaina et al. |
| 2019/0057616 A1 | 2/2019 | Cohen et al. |
| 2019/0073834 A1 | 3/2019 | Holzer et al. |
| 2019/0107991 A1 | 4/2019 | Spivack et al. |
| 2019/0188920 A1 | 6/2019 | Mcphee et al. |
| 2019/0221031 A1 | 7/2019 | De La Carcova et al. |
| 2019/0251720 A1 | 8/2019 | Hariton |
| 2019/0304189 A1 | 10/2019 | Falstrup et al. |
| 2019/0311341 A1 | 10/2019 | Rice |
| 2019/0385378 A1 | 12/2019 | Bastian et al. |
| 2020/0066014 A1 | 2/2020 | Mehta et al. |
| 2020/0066052 A1 | 2/2020 | Antonsen et al. |
| 2020/0074738 A1 | 3/2020 | Hare et al. |
| 2020/0082535 A1 | 3/2020 | Lindskog et al. |
| 2020/0105006 A1 | 4/2020 | Karsch et al. |
| 2020/0167995 A1 | 5/2020 | Hare et al. |
| 2020/0184731 A1 | 6/2020 | Egri et al. |
| 2020/0202632 A1 | 6/2020 | Goodrich et al. |
| 2020/0327734 A1 | 10/2020 | Goodrich et al. |
| 2020/0334916 A1 | 10/2020 | Mcphee et al. |
| 2020/0380259 A1 | 12/2020 | Cahill et al. |
| 2020/0410763 A1 | 12/2020 | Hare et al. |
| 2021/0074074 A1 | 3/2021 | Goodrich et al. |
| 2021/0132686 A1 | 5/2021 | Awaji |
| 2021/0174600 A1 | 6/2021 | Hare et al. |
| 2021/0241537 A1 | 8/2021 | Ahn |
| 2021/0264668 A1 | 8/2021 | Goodrich et al. |
| 2022/0036660 A1 | 2/2022 | Mcphee et al. |
| 2022/0044311 A1 | 2/2022 | Ray |
| 2022/0076504 A1 | 3/2022 | Goodrich et al. |
| 2022/0121874 A1 | 4/2022 | Mayes et al. |
| 2022/0375178 A1 | 11/2022 | Hare et al. |
| 2023/0037233 A1 | 2/2023 | Goodrich et al. |

FOREIGN PATENT DOCUMENTS

| | | |
|---|---|---|
| CN | 103460256 | 12/2013 |
| CN | 104764452 | 7/2015 |
| CN | 105278826 A | 1/2016 |
| CN | 105607034 | 5/2016 |
| CN | 106033333 A | 10/2016 |
| CN | 107093204 A | 8/2017 |
| CN | 107209950 A | 9/2017 |
| CN | 107329962 A | 11/2017 |
| CN | 109863510 A | 6/2019 |
| CN | 109863532 A | 6/2019 |
| CN | 110168476 A | 8/2019 |
| CN | 110168478 A | 8/2019 |
| CN | 112639691 A | 4/2021 |
| CN | 113330484 A | 8/2021 |
| CN | 114026831 | 2/2022 |
| CN | 114341780 | 4/2022 |
| CN | 110168478 | 1/2023 |
| EP | 2184092 A2 | 5/2010 |
| EP | 3086292 A1 | 10/2016 |
| EP | 3506213 A1 | 7/2019 |
| JP | 2001230801 A | 8/2001 |
| JP | 5497931 B2 | 3/2014 |
| KR | 20130119473 | 10/2013 |
| KR | 20140020871 | 2/2014 |
| KR | 101445263 B1 | 9/2014 |
| KR | 20150013709 A | 2/2015 |
| KR | 20150038272 A | 4/2015 |
| KR | 20150126938 | 11/2015 |
| KR | 20190075977 A | 7/2019 |
| KR | 102257167 B1 | 5/2021 |
| KR | 102367928 | 3/2022 |
| KR | 102482293 B1 | 12/2022 |
| WO | WO-2003094072 A1 | 11/2003 |
| WO | WO-2004095308 A1 | 11/2004 |
| WO | WO-2006107182 A1 | 10/2006 |
| WO | WO-2007134402 A1 | 11/2007 |
| WO | WO-2011109126 A1 | 9/2011 |
| WO | WO-2012139276 A1 | 10/2012 |
| WO | WO-2013017991 A1 | 2/2013 |
| WO | WO-2013027893 A1 | 2/2013 |
| WO | WO-2013152454 A1 | 10/2013 |
| WO | WO-2013166588 A1 | 11/2013 |
| WO | WO-2014031899 A1 | 2/2014 |
| WO | WO-2014194439 A1 | 12/2014 |
| WO | WO-2016090605 A1 | 6/2016 |
| WO | WO-2018081013 A1 | 5/2018 |
| WO | WO-2018081125 A1 | 5/2018 |
| WO | WO-2018102562 A1 | 6/2018 |
| WO | WO-2018128930 | 7/2018 |
| WO | WO-2018129531 | 7/2018 |
| WO | WO-2018129531 A1 | 7/2018 |
| WO | WO-2019089613 A1 | 5/2019 |
| WO | WO-2020047117 A1 | 3/2020 |
| WO | WO-2020132541 A1 | 6/2020 |
| WO | WO-2020264551 A2 | 12/2020 |
| WO | WO-2021003499 A1 | 1/2021 |
| WO | WO-2020264551 A3 | 2/2021 |
| WO | WO-2021046582 A1 | 3/2021 |

OTHER PUBLICATIONS

"U.S. Appl. No. 16/747,318, PTO Response to Rule 312 Communication dated Nov. 23, 2021", 3 pgs.

"European Application Serial No. 19769288.2, Response filed Sep. 29, 2021 to Communication Pursuant to Rules 161(1) and 162 EPC dated Apr. 8, 2021", 24 pgs.

"Korean Application Serial No. 10-2021-7015384, Response filed Oct. 7, 2021 to Notice of Preliminary Rejection dated Jun. 11, 2021", w English Claims, 17 pgs.

"U.S. Appl. No. 15/581,994, Non Final Office Action dated Jun. 26, 2018", 14 pgs.

"U.S. Appl. No. 15/863,575, Non Final Office Action dated Aug. 9, 2018", 14 pgs.

"U.S. Appl. No. 15/863,575, Notice of Allowance dated Nov. 15, 2018", 8 pgs.

"U.S. Appl. No. 16/242,708, Response filed Sep. 24, 2018 to Non Final Office Action dated Aug. 9, 2018", 9 pgs.

"U.S. Appl. No. 16/242,708, Corrected Notice of Allowability dated Feb. 23, 2021", 2 pgs.

"U.S. Appl. No. 16/242,708, Examiner Interview Summary dated Jul. 29, 2020", 3 pgs.

"U.S. Appl. No. 16/242,708, Final Office Action dated Jul. 2, 2020", 25 pgs.

"U.S. Appl. No. 16/242,708, Non Final Office Action dated Feb. 28, 2020", 19 pgs.

"U.S. Appl. No. 16/242,708, Notice of Allowance dated Feb. 4, 2021", 7 pgs.

"U.S. Appl. No. 16/242,708, Notice of Allowance dated Aug. 19, 2020", 5 pgs.

"U.S. Appl. No. 16/242,708, Notice of Allowance dated Nov. 4, 2020", 7 pgs.

"U.S. Appl. No. 16/242,708, Response filed May 15, 2020 to Non Final Office Action dated Feb. 28, 2020", 11 pgs.

"U.S. Appl. No. 16/242,708, Response filed Aug. 5, 2020 to Final Office Action dated Jul. 2, 2020", 11 pgs.

(56) References Cited

OTHER PUBLICATIONS

"U.S. Appl. No. 16/283,482, Examiner Interview Summary dated Feb. 19, 2020", 3 pgs.
"U.S. Appl. No. 16/283,482, Final Office Action dated Dec. 16, 2019", 15 pgs.
"U.S. Appl. No. 16/283,482, Non Final Office Action dated Jun. 26, 2019", 13 pgs.
"U.S. Appl. No. 16/283,482, Notice of Allowance dated Apr. 2, 2020", 9 pgs.
"U.S. Appl. No. 16/283,482, Response filed Mar. 9, 2020 to Final Office Action dated Dec. 16, 2019", 11 pgs.
"U.S. Appl. No. 16/283,482, Response filed Sep. 26, 2019 to Non Final Office Action dated Jun. 26, 2019", 13 pgs.
"U.S. Appl. No. 16/457,461, Examiner Interview Summary dated Jul. 10, 2020", 3 pgs.
"U.S. Appl. No. 16/457,461, Final Office Action dated Jul. 14, 2020", 16 pgs.
"U.S. Appl. No. 16/457,461, Non Final Office Action dated Apr. 16, 2020", 13 pgs.
"U.S. Appl. No. 16/457,461, Notice of Allowance dated Sep. 2, 2020", 7 pgs.
"U.S. Appl. No. 16/457,461, Notice of Allowance dated Nov. 19, 2020", 8 pgs.
"U.S. Appl. No. 16/457,461, Response filed Jul. 1, 2020 to Non Final Office Action dated Apr. 16, 2020", 9 pgs.
"U.S. Appl. No. 16/457,461, Response filed Aug. 20, 2020 to Final Office Action dated Jul. 14, 2020", 8 pgs.
"U.S. Appl. No. 16/696,600, Non Final Office Action dated Sep. 15, 2020", 20 pgs.
"U.S. Appl. No. 16/696,600, Notice of Allowability dated Jan. 26, 2021", 2 pgs.
"U.S. Appl. No. 16/696,600, Notice of Allowance dated Dec. 18, 2020", 11 pgs.
"U.S. Appl. No. 16/696,600, Response filed Oct. 30, 2020 to Non Final Office Action dated Sep. 15, 2020", 8 pgs.
"U.S. Appl. No. 16/747,318, Non Final Office Action dated Dec. 15, 2020", 11 pgs.
"European Application Serial No. 18713732.8, Response to Communication Pursuant to Rules 161(1) and 162 EPC filed Feb. 19, 2020", 25 pgs.
"International Application Serial No. PCT/US2018/012967, International Preliminary Report on Patentability dated Jul. 18, 2019", 8 pgs.
"International Application Serial No. PCT/US2018/012967, International Search Report dated May 15, 2018", 5 pgs.
"International Application Serial No. PCT/US2018/012967, Written Opinion dated May 15, 2018", 6 pgs.
"International Application Serial No. PCT/US2019/048597, International Search Report dated Dec. 2, 2019", 5 pgs.
"International Application Serial No. PCT/US2019/048597, Written Opinion dated Dec. 2, 2019", 8 pgs.
"International Application Serial No. PCT/US2019/068007, International Search Report dated Apr. 30, 2020", 10 pgs.
"International Application Serial No. PCT/US2019/068007, Invitation to Pay Additional Fees dated Mar. 11, 2020", 18 pgs.
"International Application Serial No. PCT/US2019/068007, Written Opinion dated Apr. 30, 2020", 15 pgs.
"International Application Serial No. PCT/US2020/070158, International Search Report dated Dec. 17, 2020", 5 pgs.
"International Application Serial No. PCT/US2020/070158, Invitation to Pay Additional Fees dated Oct. 1, 2020", 12 pgs.
"International Application Serial No. PCT/US2020/070158, Written Opinion dated Dec. 17, 2020", 12 pgs.
"International Application Serial No. PCT/US2020/070503, International Search Report dated Dec. 2, 2020", 5 pgs.
"International Application Serial No. PCT/US2020/070503, Written Opinion dated Dec. 2, 2020", 7 pgs.
"Korean Application Serial No. 10-2019-7023098, Notice of Preliminary Rejection dated Oct. 8, 2020", w/ English translation, 15 pgs.
"Korean Application Serial No. 10-2019-7023098, Response filed Jan. 8, 2021 to Notice of Preliminary Rejection dated Oct. 8, 2020", w/ English Claims, 19 pgs.
Giaccone, P R, et al., "Foreground-background segmentation by cellular neural networks", IEEE 15th International Conference on Pattern Recognition (ICPR-2000), vol. 2, (2000), 438-441.
Kawai, Norihiko, et al., "Diminished Reality Based on Image Inpainting Considering Background Geometry", IEEE transactions on visualization and computer graphics, 22(3), (Mar. 1, 2016), 1236-1247.
Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.
Marto, Anabela G R, et al., "DinofelisAR Demo: Augmented Reality Based on Natural Features", 12th Iberian Conference on Information Systems and Technologies (CISTI), Lisbon, Portugal, (Jun. 2017), 6 pgs.
Nakajima, Yoshikatsu, et al., "Semantic Object Selection and Detection for Diminished Reality Based on SLAM with Viewpoint Ciass", IEEE International Symposium on Mixed and Augmented Reality Adjunct Proceedings, (2017), 338-343.
Park, Jong-Seung, et al., "Virtual Object Placement in Video for Augmented Reality", Advances in Multimedia Information Processing—PCM 2005: 6th Pacific Rim Conference on Multimedia, Jeju Island, KR, Proceedings (vol. 3767). Springer, Berlin, DE, (2005), 13-24.
Park, Jungsik, et al., "[Poster] Interactive deformation of real objects", 2014 IEEE International Symposium on Mixed and Augmented Reality (ISMAR), (Sep. 10, 2014), 295-296.
Robinson, Ian, "Add 3D text to video footage", Adobe.com/Youtube video, [Online] Retrieved from the Internet: <URL: https://helpx.adobe.com/after-effects/how-to/add-3d-text-video-footage.html>, (Mar. 10, 2017), 360 pgs.; 15:22 min.
Salas-Morena, Renato F, et al., "Dense Planar SLAM", IEEE Intl. Symposium on Mixed and Augmented Reality (ISMAR), Munich, Germany, [Online] Retrieved from the Internet: <URL: http://www.doc.ic.ac.uk/˜bglocker/pdfs/salas-moreno2014ismar.pdf>, (Sep. 2014), 8 pgs.
Schettini, R, et al., "A segmentation algorithm for color images", Pattern Recognition Letters, Elsevier, Amsterdam, NL, vol. 14, No. 6, (Jun. 1, 1993), 499-506.
Shohei, Mori, et al., "A survey of diminished reality: Techniques for visually concealing, eliminating, and seeing through real objects", IPSJ Transactions on Computer Vision and Applications, vol. 9, No. 1, (Jun. 28, 2017), 14 pgs.
"U.S. Appl. No. 16/747,318, Corrected Notice of Allowability dated Dec. 22, 2021", 2 pgs.
"U.S. Appl. No. 16/723,540, Response filed Dec. 23, 2021 to Final Office Action dated Sep. 27, 2021", 10 pgs.
"International Application Serial No. PCT US2020 070158, International Preliminary Report on Patentability dated Jan. 6, 2022", 14 pgs.
"U.S. Appl. No. 16/723,540, Non Final Office Action dated Jan. 26, 2022", 19 pgs.
"European Application Serial No. 19845741.8, Response filed Feb. 3, 2022 to Communication Pursuant to Rules 161 and 162 EPC dated Jul. 27, 2021", 19 pgs.
"Chinese Application Serial No. 201880006129.X, Office Action dated Jan. 5, 2022", w English translation, 18 pgs.
"U.S. Appl. No. 15/581,994, Corrected Notice of Allowability dated Jan. 7, 2020", 2 pgs.
"U.S. Appl. No. 15/581,994, Corrected Notice of Allowability dated Feb. 18, 2020", 3 pgs.
"U.S. Appl. No. 15/581,994, Final Office Action dated Dec. 3, 2018", 18 pgs.
"U.S. Appl. No. 15/581,994, Non Final Office Action dated Jun. 6, 2019", 15 pgs.
"U.S. Appl. No. 15/581,994, Notice of Allowance dated Nov. 6, 2019", 8 pgs.
"U.S. Appl. No. 15/581,994, Response filed Feb. 26, 2019 to Final Office Action dated Dec. 3, 2018", 11 pgs.
"U.S. Appl. No. 15/581,994, Response filed Sep. 26, 2018 to Non Final Office Action dated Jun. 26, 2018", 11 pgs.

(56) References Cited

OTHER PUBLICATIONS

"U.S. Appl. No. 15/581,994, Response filed Aug. 19, 2019 to Non-Final Office Action dated Jun. 6, 2019", 12 pgs.
"U.S. Appl. No. 16/457,461, Corrected Notice of Allowability dated Feb. 26, 2021", 2 pgs.
"U.S. Appl. No. 16/457,461, Notice of Allowance dated Apr. 14, 2021", 7 pgs.
"U.S. Appl. No. 16/457,461, Notice of Allowance dated Jul. 28, 2021", 5 pgs.
"U.S. Appl. No. 16/460,519, Final Office Action dated Jan. 6, 2021", 33 pgs.
"U.S. Appl. No. 16/460,519, Non Final Office Action dated Sep. 4, 2020", 27 pgs.
"U.S. Appl. No. 16/460,519, Response filed Dec. 2, 2020 to Non Final Office Action dated Sep. 4, 2020", 10 pgs.
"U.S. Appl. No. 16/696,600, 312 Amendment filed Jul. 7, 2021", 7 pgs.
"U.S. Appl. No. 16/696,600, Corrected Notice of Allowability dated May 12, 2021", 2 pgs.
"U.S. Appl. No. 16/696,600, Corrected Notice of Allowability dated Jul. 21, 2021", 3 pgs.
"U.S. Appl. No. 16/696,600, Corrected Notice of Allowability dated Sep. 8, 2021", 2 pgs.
"U.S. Appl. No. 16/696,600, Notice of Allowance dated May 4, 2021", 9 pgs.
"U.S. Appl. No. 16/696,600, Notice of Allowance dated Aug. 17, 2021", 8 pgs.
"U.S. Appl. No. 16/723,540, Examiner Interview Summary dated Jun. 16, 2021", 2 pgs.
"U.S. Appl. No. 16/723,540, Final Office Action dated Sep. 27, 2021", 18 pgs.
"U.S. Appl. No. 16/723,540, Non Final Office Action dated Mar. 18, 2021", 15 pgs.
"U.S. Appl. No. 16/723,540, Response filed Jun. 16, 2021 to Non Final Office Action dated Mar. 18, 2021", 10 pgs.
"U.S. Appl. No. 16/747,318, Examiner Interview Summary dated Mar. 12, 2021", 2 pgs.
"U.S. Appl. No. 16/747,318, Final Office Action dated May 12, 2021", 14 pgs.
"U.S. Appl. No. 16/747,318, Notice of Allowance dated Sep. 9, 2021", 6 pgs.
"U.S. Appl. No. 16/747,318, Response filed Mar. 15, 2021 to Non Final Office Action dated Dec. 15, 2020", 11 pgs.
"U.S. Appl. No. 16/747,318, Response filed Aug. 12, 2021 to Final Office Action dated May 12, 2021", 11 pgs.
"U.S. Appl. No. 16/790,322, Non Final Office Action dated Nov. 25, 2020", 21 pgs.
"U.S. Appl. No. 16/922,618, Non Final Office Action dated Apr. 27, 2021", 9 pgs.
"U.S. Appl. No. 16/922,618, Notice of Allowance dated Aug. 4, 2021", 9 pgs.
"U.S. Appl. No. 16/922,618, Response filed Jun. 17, 2021 to Non Final Office Action dated Apr. 27, 2021", 7 pgs.
"European Application Serial No. 17835983.2, Response to Communication Pursuant to Rules 161(1) and 162 EPC filed Feb. 19, 2020", 11 pgs.
"European Application Serial No. 17865596.5, Extended European Search Report dated Sep. 13, 2019", 11 pgs.
"European Application Serial No. 17865596.5, Response filed Apr. 9, 2020 to Extended European Search Report dated Sep. 13, 2019", 21 pgs.
"European Application Serial No. 21153993.7, Extended European Search Report dated May 12, 2021", 9 pgs.
"International Application Serial No. PCT/US2017/058093, International Preliminary Report on Patentability dated May 9, 2019", 6 pgs.
"International Application Serial No. PCT/US2017/058093, International Search Report dated Jan. 4, 2018", 2 pgs.
"International Application Serial No. PCT/US2017/058093, Written Opinion dated Jan. 4, 2018", 4 pgs.
"International Application Serial No. PCT/US2017/068988, International Preliminary Report on Patentability dated Jul. 18, 2018", 8 pgs.
"International Application Serial No. PCT/US2017/068988, International Search Report dated Apr. 5, 2018", 3 pgs.
"International Application Serial No. PCT/US2017/068988, Written Opinion dated Apr. 5, 2018", 6 pgs.
"International Application Serial No. PCT/US2019/048597, International Preliminary Report on Patentability dated Mar. 11, 2021", 10 pgs.
"International Application Serial No. PCT/US2019/068007, International Preliminary Report on Patentability dated Jul. 1, 2021", 17 pgs.
"International Application Serial No. PCT/US2020/070230, International Search Report dated Nov. 5, 2020", 7 pgs.
"International Application Serial No. PCT/US2020/070230, Invitation to Pay Additional Fees dated Sep. 15, 2020", 16 pgs.
"International Application Serial No. PCT/US2020/070230, Written Opinion dated Nov. 5, 2020", 14 pgs.
"Korean Application Serial No. 10-2021-7015384, Notice of Preliminary Rejection dated Jun. 11, 2021", With English translation, 13 pgs.
"Mirror my texture", C4dcafe, [Online] Retrieved from the Internet: <URL: https://www.c4dcafe.com/ipb/forums/topic/95957-mirror-my-texture/>, (2016), 3 pgs.
Deepu, R, et al., "3D Reconstruction from Single 2D Image", International Journal of Latest Research in Engineering and Technology (IJLRET), 2(1), (Jan. 2016), 42-51.
Keeler, Alice, "Google Slides: Make a Draggable Stack", Teacher Tech with Alice Keeler, [Online] Retrieved from the Internet: <URL: https://alicekeeler.com/2017/04/10/google-slides-make-draggable-stack/>, (2017), 9 pgs.
Long, et al., "Context-Aware Mixed Reality: A Framework for Ubiquitous Interaction", arXiv:1803.05541v1, Cornell University Library, Ithaca, NY, (Mar. 14, 2018), 11 pgs.
Pixovert, "Create Ray Traced 3D Text in After Effects CS6", Youtube Video, [Online] Retrieved from the Internet: <URL: https://www.youtube.com/watch?v=qGbVQRTrhXM>, (Mar. 24, 2013), 15 pgs.; 7:09 min.
Wang, Nanyang, et al., "Pixel2mesh: Generating 3d mesh models from single rgb images", Proceedings of the European Conference on Computer Vision (ECCV); arXlv:1804.01654v2 [cs.CV], (2018), 16 pgs.
Ward, Caleb, "5 Creative Ways to Use Layer Stacking in After Effects", Rocketstock Blog, [Online] Retrieved from the Internet: <URL: https://www.rocketstock.com/blog/5-creative-ways-use-layer-stacking-effects/>, (2015), 9 pgs.
You, Suya, et al., "Hybrid Inertial and Vision Tracking for Augmented Reality Registration", Proceedings IEEE Virtual Reality (Cat. No. 99CB36316), (1999), 8 pgs.
"U.S. Appl. No. 16/723,540, Notice of Allowance dated Jun. 29, 2022", 5 pgs.
"U.S. Appl. No. 16/723,540, Supplemental Notice of Allowability dated Aug. 15, 2022", 8 pgs.
"U.S. Appl. No. 17/249,092, Notice of Allowability dated Aug. 12, 2022", 2 pgs.
"U.S. Appl. No. 17/319,399, Notice of Allowance dated Aug. 25, 2022", 9 pgs.
"U.S. Appl. No. 17/319,399, Response filed Jul. 21, 2022 to Non Final Office Action dated Apr. 22, 2022", 8 pgs.
"Chinese Application Serial No. 201880006129, Response filed Aug. 29, 2022 to Office Action dated Jun. 17, 2022", w/ English Claims, 14 pgs.
"Chinese Application Serial No. 201880006129.X, Office Action dated Jun. 17, 2022", w/ English translation, 13 pgs.
"Korean Application Serial No. 10-2022-7005953, Response filed Aug. 3, 2022 to Office Action dated Apr. 4, 2022", w/ English Claims, 20 pgs.
"U.S. Appl. No. 16/723,540, Amendment Under 37 C.F.R. 1.312 filed Sep. 20, 2022", 8 pgs.
"U.S. Appl. No. 16/723,540, Supplemental Notice of Allowability dated Sep. 29, 2022", 2 pgs.

(56) References Cited

OTHER PUBLICATIONS

"U.S. Appl. No. 16/723,540, PTO Response to Rule 312 Communication dated Sep. 29, 2022", 2 pgs.
"U.S. Appl. No. 17/505,370, Non Final Office Action dated Oct. 17, 2022", 16 pgs.
"U.S. Appl. No. 17/527,376, Non Final Office Action dated Nov. 10, 2022", 20 pgs.
"Chinese Application Serial No. 201880006129.X, Response to Examiner Telephone Interview filed Sep. 22, 2022", With English machine translation, 102 pgs.
"European Application Serial No. 20775562.0, Response to Communication pursuant to Rules 161 and 162 filed Sep. 27, 2022", 23 pgs.
"International Application Serial No. PCT US2020 070503, International Preliminary Report on Patentability dated Mar. 17, 2022", 9 pgs.
"Korean Application Serial No. 10-2022-7005953, Notice of Preliminary Rejection dated Apr. 4, 2022", w English Translation, 13 pgs.
"U.S. Appl. No. 17/319,399, Non Final Office Action dated Apr. 22, 2022", 8 pgs.
"Chinese Application Serial No. 201880006129.X, Response filed Apr. 20, 2022 toOffice Action dated Jan. 5, 2022", With Concise Statement, 10 pgs.
"U.S. Appl. No. 16/723,540, Response filed Apr. 26, 2022 to Non Final Office Action dated Jan. 26, 2022", 10 pgs.
"U.S. Appl. No. 17/249,092, Notice of Allowance dated May 4, 2022", 12 pgs.
"U.S. Appl. No. 17/319,399, Corrected Notice of Allowability dated Jan. 11, 2023", 2 pgs.
"U.S. Appl. No. 17/505,370, Notice of Allowance dated Jan. 13, 2023", 8 pgs.
"U.S. Appl. No. 17/505,370, Response filed Dec. 21, 2022 to Non Final Office Action dated Oct. 17, 2022", 8 pgs.
"U.S. Appl. No. 17/527,376, Response filed Feb. 10, 2023 to Non Final Office Action dated Nov. 10, 2022", 12 pgs.
"Chinese Application Serial No. 202080047024.6, Office Action dated Nov. 30, 2022", w/English Translation, 16 pgs.
"U.S. Appl. No. 17/319,399, Corrected Notice of Allowability dated Feb. 27, 2023", 2 pgs.
"U.S. Appl. No. 17/527,376, Final Office Action dated Mar. 1, 2023", 21 pgs.

* cited by examiner

VIDEO CLIP OBJECT TRACKING

CROSS-REFERENCE TO RELATED APPLICATION

This application is a continuation of U.S. patent application Ser. No. 16/242,708, filed on Jan. 8, 2019, which claims the benefit of priority of Samuel Edward Hare et al., U.S. Provisional Patent Application No. 62/725,058, entitled "VIDEO CLIP OBJECT TRACKING," filed on Aug. 30, 2018, the entireties of each of which are hereby incorporated by reference herein.

TECHNICAL FIELD

The present disclosure relates generally to visual presentations and more particularly to rendering virtual modifications to surfaces in real-world environments.

BACKGROUND

Virtual rendering systems can be used to create engaging and entertaining augmented reality experiences, in which three-dimensional virtual object graphics content appears to be present in the real-world. Such systems can be subject to presentation problems due to environmental conditions, user actions, unanticipated visual interruption between a camera and the object being rendered, and the like. This can cause a virtual object to disappear or otherwise behave erratically, which breaks the illusion of the virtual objects being present in the real-world.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
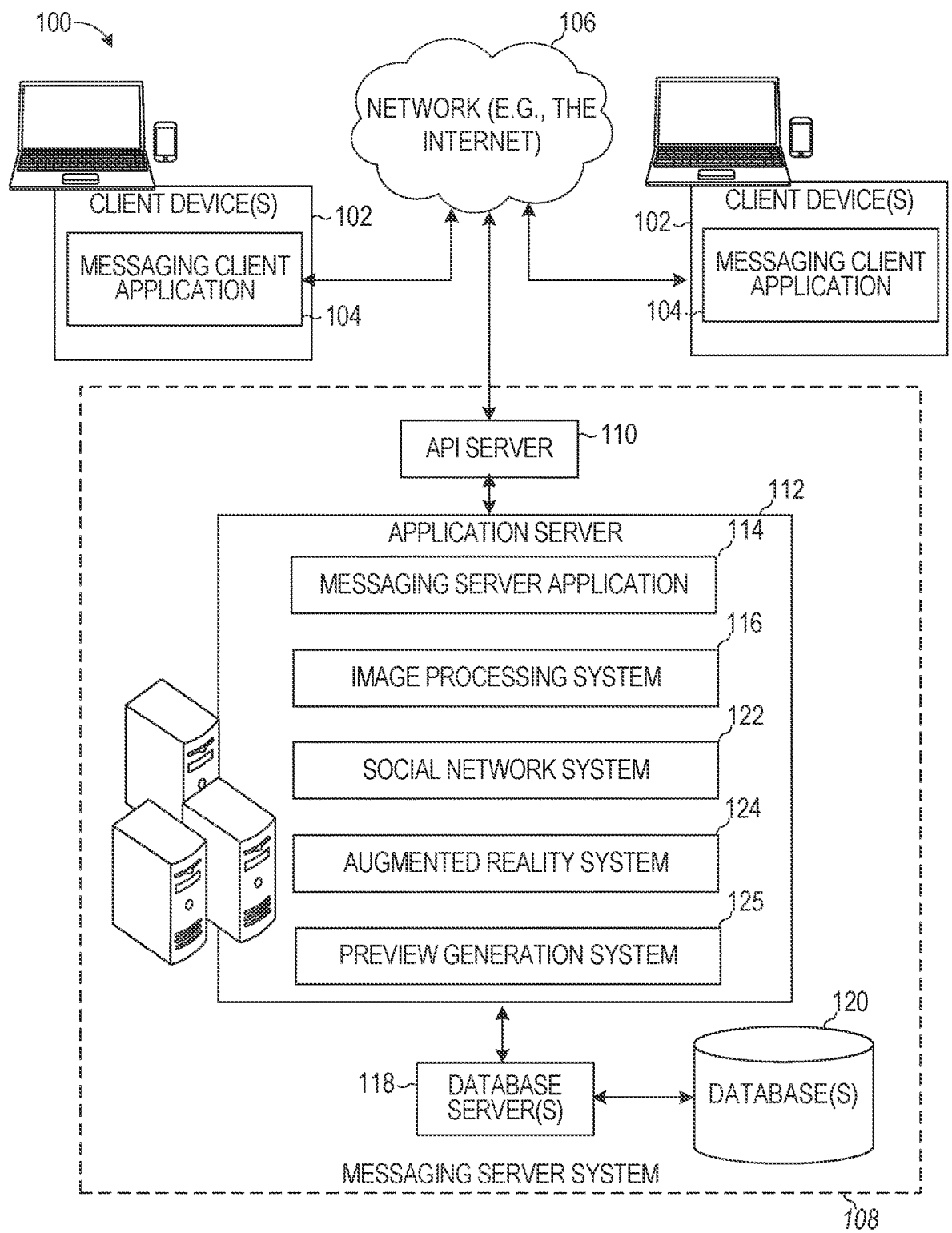
FIG. 1 is a block diagram showing an example messaging system for exchanging data (e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Among other things, embodiments of the present disclosure improve the functionality of electronic messaging and imaging software and systems by rendering a virtual object (e.g., a three-dimensional object, such as a 3D caption, emoji, character, avatar, animation, looping animation of a personalized avatar or character, looping or non-looping animated graphic such as a dancing hot dog, a stylized word with animation and particles effects, etc.) and effects as if it exists in a real-world scene containing real-world objects featured in a video clip. In some embodiments, one such virtual object is selected by a user and added to the video clip to provide the illusion that the selected virtual object is part of the real-world scene. In some embodiments, placement and positioning of the selected virtual object is dynamically adjusted relative to real-world objects in the video clip, as the video clip plays, to maintain the illusion that the virtual object is part of the real-world scene. In order to dynamically, adjust the placement and positioning of the virtual object relative to the real-world objects in the scene, sensor information (e.g., accelerometer sensor information, GPS sensor information, imaging sensor information, etc.), that has been captured together with the video clip, is utilized in conjunction with image processing. In particular, the sensor information in combination with image processing allows the system to process the video clip to identify and track positions of real-world objects throughout the clip in order to determine and adjust the position of the virtual object relative to those real-world objects.

In order to increase efficiency and reduce overall lag, the timing for when the sensor and image processing of the video clip is performed is determined based on user interactions. In particular, the sensor and image processing of the video clip can be delayed until an initial user request to modify the video clip is received and before the user selects the given virtual object. The delaying of the processing of the video clip until the initial user request is received avoids unnecessary lag in processing of the video clip during capture or while performing other operations. In addition, processing the video clip before a user selects a given virtual object to add to the video clip avoids having to perform such processing as the user manipulates the virtual object within the video clip. This enables the user to smoothly modify a position and orientation of the virtual object in the video clip and immediately preview or see the video clip with the included virtual object from start to finish with little or no wait time.

For example, after the video clip is captured, a user can preview the video clip and can attach (e.g., pin or anchor) the virtual object to a real-world object featured in the frame. If the user attaches the virtual object to a moving real-world object, the virtual object follows the position of the moving real-world object throughout the clip. This can be thought of as pinning a virtual hat to a person's head featured in the video clip. As the person walks around the scene in view, the virtual hat appears to stay on the person's head. If the user attaches the virtual object to a stationary real-world object, the virtual object remains at the same position as the camera angle changes throughout the clip. This can be thought of as anchoring a virtual tree to sand on a beach featured in the video clip. As the camera view/angle changes (e.g., pans from left to right, up to down, down to up, or right to left, or is moved in any other direction), the sand moves into and out of view in the scene together with the virtual tree. After attaching the virtual object to the real-world object in the video clip, the video clip repeatedly plays from start to finish featuring the virtual object and can be shared with other users.

FIG. 1 is a block diagram showing an example messaging system 100 for exchanging data (e.g., messages and associated content) over a network 106. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video, or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy, certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, virtual objects, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of such collections, the retrieval of a list of friends of a user of a client device 102, the retrieval of messages and content, the adding and deleting of friends to a social graph, the location of friends within a social graph, opening an application event (e.g., relating to the messaging client application 104).

The application server 112 hosts a number of applications and subsystems, including a messaging server application 114, an image processing system 116, a social network system 122, an augmented reality system 124, and a preview generation system 125, The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions and services, and makes these functions and services available to the messaging server application 114. To this end, the social network system 122 maintains and accesses an entity graph within the database 120. Examples of functions and services supported by the social network system 122 include the identification of other users of the messaging system 100 with which a particular user has relationships or is "following," and also the identification of other entities and interests of a particular user.

The augmented reality system 124 provides functionality to generate, display, and track virtual objects at positions relative to the client device 102, within a three-dimensional space or at positions relative to real-world objects featured in a real-world scene of a video clip within a three-dimensional space. The augmented reality system 124 comprises a set of tracking subsystems configured to track the virtual object at the position in three-dimensional space based on a set of tracking indicia which may have been stored and associated with the video clip, and transition between tracking subsystems. The augmented reality system 124 may further transition between tracking with six degrees of freedom (6DoF) and tracking with three degrees of freedom (3DoF) based on an availability of the tracking indicia stored for the video clip.

The preview generation system 125 provides functionality to generate video clips. The preview generation system 125 communicates with a camera of the client device 102 and one or more sensors of the client device 102 (e.g., GPS sensors, inertial measurement sensor, etc.). The preview generation system 125 receives a user request to initiate recording of video from the client device 102. The user request may be an input that specifies the length of a video, in which case the preview generation system 125 captures a video segment of a real-world scene having the specified length (e.g., 3-5 seconds). The user request may include a first input that starts a recording session and a second input that later stops the recording session. In this case, the preview generation system 125 captures a video segment of a real-world scene starting when the first input is received and ending when the second input is received. While the preview generation system 125 captures and stores the video footage from the camera of the client device 102, the preview generation system 125 also captures and stores the sensor information from the client device 102 associated with the recording session. For example, the preview generation system 125 may store some or all of the sensor information obtained from client device 102 for each frame of the video clip (e.g., using one or more of the described tracking subsystems).

After the video clip is captured by the preview generation system 125, the preview generation system 125 presents the video clip to the user in a preview mode of operation on client device 102. In this mode, the video clip runs repeatedly from beginning to end such that when the end point of the video clip is reached, the video starts playing again automatically from the beginning. The user can interact with the video clip being presented at any time to modify the video clip using the client device 102. For example, at any point during playback of the video clip, the user can issue a request to the preview generation system 125 to add a virtual object to the video clip (e.g., the user can request to attach (anchor or pin) the virtual object to a real-world object in the video clip). In such circumstances, the preview generation system 125 communicates with the augmented reality system 124 to modify the video clip using the virtual object based on the sensor information stored with the video clip. As described further below, in some implementations, the preview generation system 125 may provide the video clip content and the sensor information to the augmented reality system 124 to leverage one or more components of the augmented reality system 124 to track positions of one or more real-world objects relative to the added virtual object.

The application server 112 is communicatively coupled to a database server 118, which facilitates access to a database 120 in which is stored data associated with messages processed by the messaging server application 114.

Figure 2:
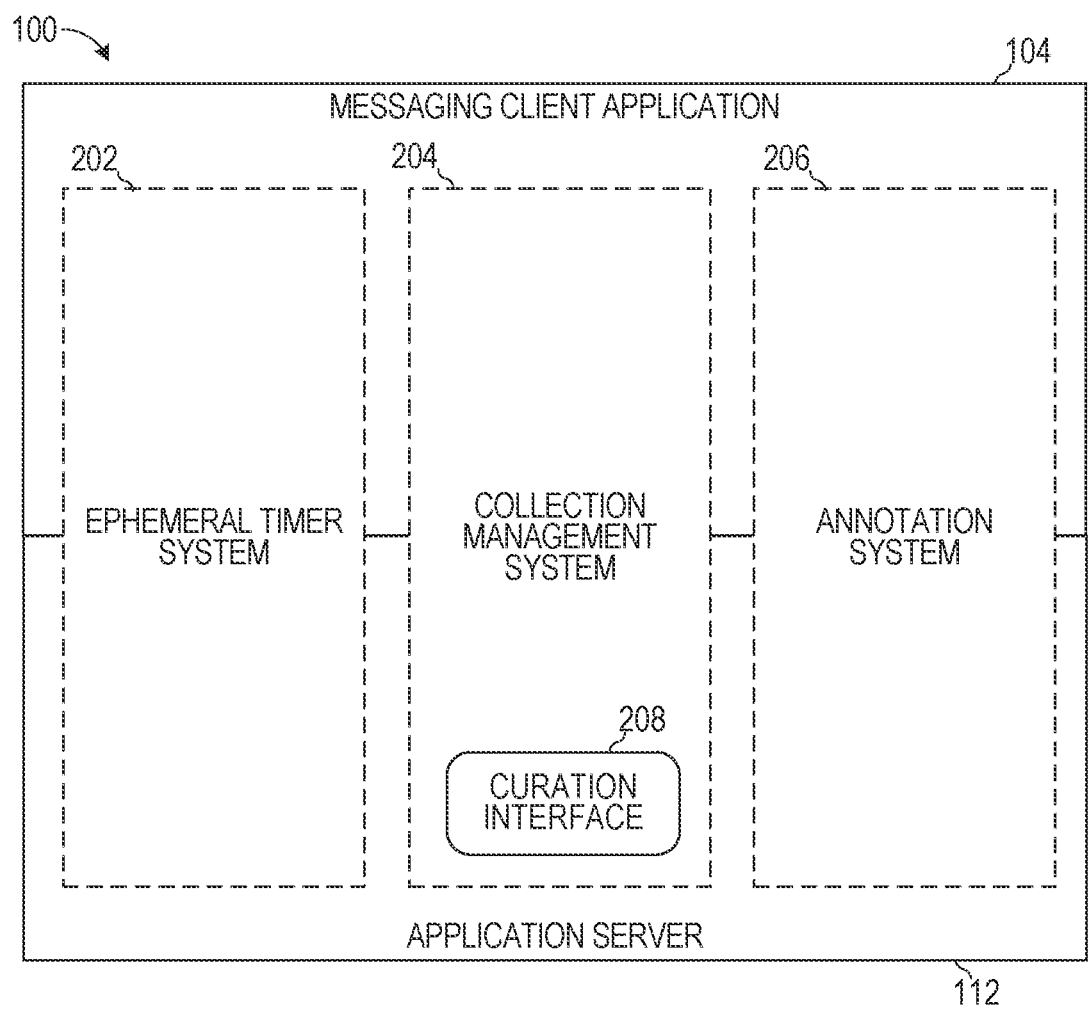
FIG. 2 is a block diagram illustrating further details regarding a messaging system, according to example embodiments.

FIG. 2 is a block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204, and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a story), selectively display and enable access to messages and associated content via the messaging client application 104. Further details regarding the operation of the ephemeral timer system 202 are provided below.

The collection management system 204 is responsible for managing collections of media (e.g., collections of text, image, video, and audio data). In some examples, a collection of content (e.g., messages, including images, video, video clips, video clips combined with virtual objects, text, and audio) may be organized into an "event gallery" or an "event story," Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects, An example of a visual effect includes color overlaying. The audio and visual content or the visual effects can be applied to a media content item (e.g., a photo) at the client device 102. For example, the media overlay including text that can be overlaid on top of a photograph generated by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map and upload content associated with the selected geolocation. The user may also specify circumstances under which a particular media overlay should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time In another example embodiment, the annotation system 206 communicates with the augmented reality system 124 and preview generation system 125 to enable a user to add a virtual object to a video clip. The user can instruct annotation system 206 to access a video clip in a preview mode of operation from the preview generation system 125 and to select a media overlay that includes the virtual object to attach to a real-world object featured at a user-designated point in time or frame of the video clip. The annotation system 206 communicates with the augmented reality system 124 to identify the real-world object and its position information throughout the video clip based on previously stored sensor information associated with the video clip. The annotation system 206 adds the selected virtual object and modifies its position throughout the video clip relative to the real-world object as the video clip repeatedly plays back from beginning to end. The modified video clip with the added virtual object is stored by the annotation system 206 and can be uploaded for sharing with other users.

Figure 3:
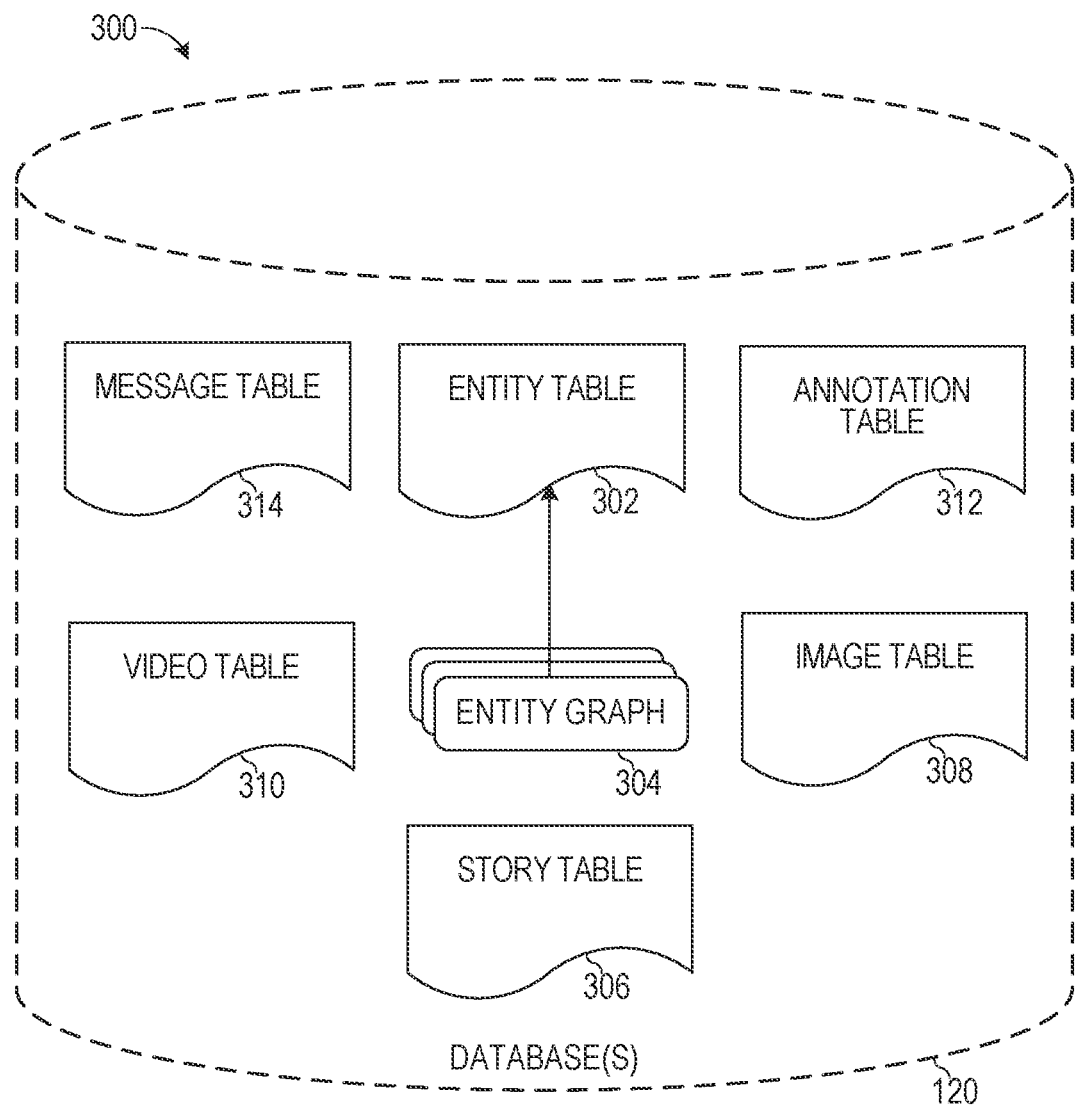
FIG. 3 is a schematic diagram illustrating data which may be stored in the database of the messaging server system, according to example embodiments.

FIG. 3 is a schematic diagram 300 illustrating data, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization), interest-based, or activity-based, merely for example.

The database 120 also stores annotation data, in the example form of filters, in an annotation table 312. Database 120 also stores annotated content (e.g., modified video clips with virtual objects) received from annotation system 206 and/or from preview generation system 125 in the annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geofilters) which may be presented to a sending user based on geographic location. For example, geolocation filters specific to a neighborhood or special location may be presented within a user interface by the messaging client application 104, based on geolocation information determined by a Global Positioning System ((IPS) unit of the client device 102. Another type of filter is a data filter, which may be selectively presented to a sending user by the messaging client application 104, based on other inputs or information gathered by the client device 102 during the message creation process. Examples of data filters include current temperature at a specific location, a current speed at which a sending user is traveling, battery life for a client device 102, or the current time.

Other annotation data that may be stored within the image table 308 is so-called "lens" data. A "lens" may be a real-time special effect and sound that may be added to an image or a video. In some cases, the virtual object added to a clip is stored as part of the lens data.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310. In some cases, video table 310 stores video clips of real-world scenes modified with the addition of virtual objects provided by annotation system 312 using preview generation system 125 and augmented reality system 124.

A story table 306 stores data regarding collections of messages and associated image, video, or audio data, which are compiled into a collection (e.g., a story or a gallery). The creation of a particular collection may be initiated by a particular user (e.g., each user for which a record is maintained in the entity table 302). A user may create a "personal story" in the form of a collection of content that has been created and sent/broadcast by that user. To this end, the UI of the messaging client application 104 may include an icon that is user-selectable to enable a sending user to add specific content to his or her personal story. The UI of the messaging client application 104 may include selectable options to enable a sending user to add a modified video clip that has a virtual object to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
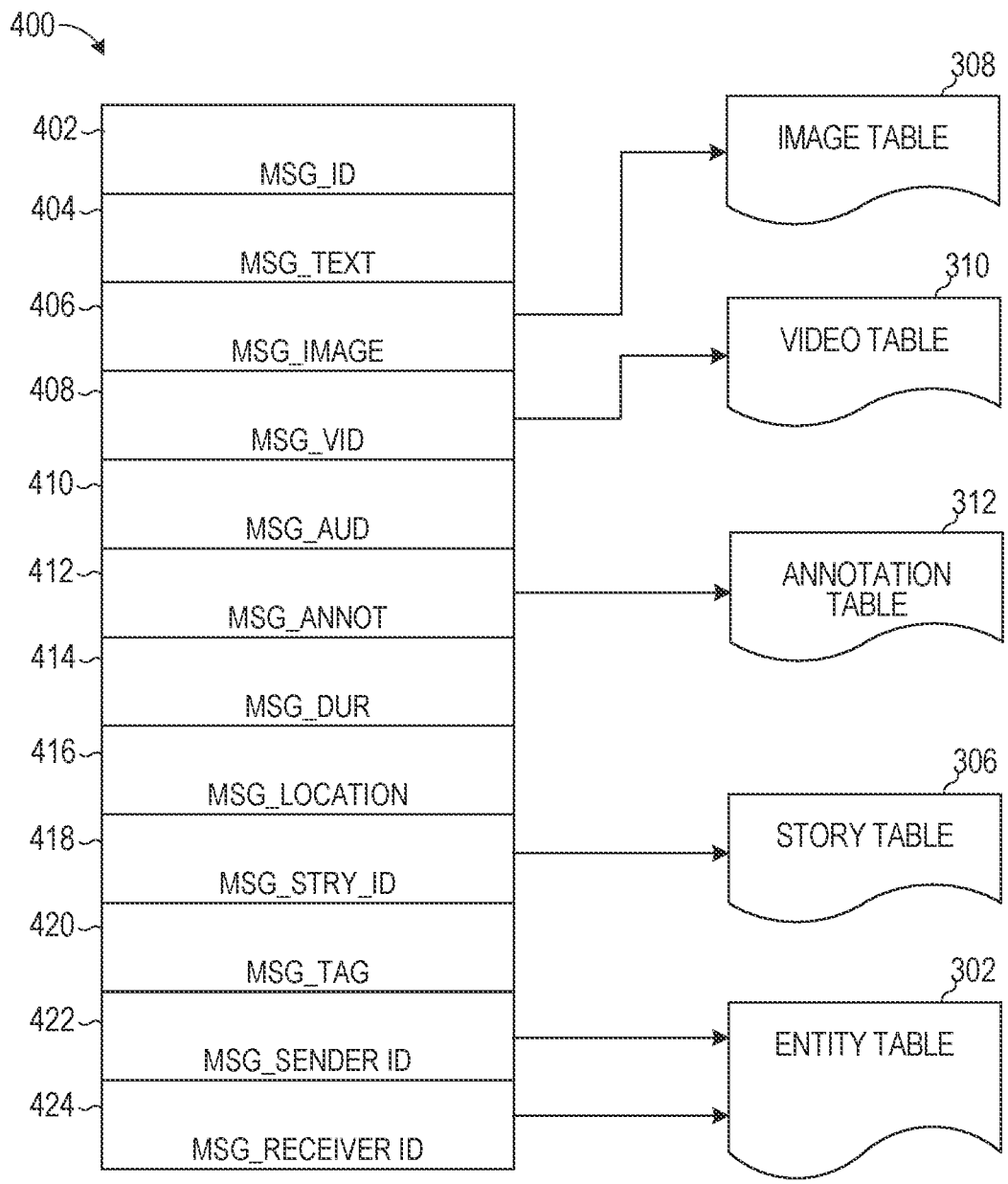
FIG. 4 is a schematic diagram illustrating a structure of a message generated by a messaging client application for communication, according to example embodiments.

FIG. 4 is a schematic diagram illustrating a structure of a message 400, according to some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

- A message identifier 402: a unique identifier that identifies the message 400.
- A message text payload 404: text, to be generated by a user via a user interface of the client device 102 and that is included in the message 400.
- A message image payload 406: image data, captured by a camera component of a client device 102 or retrieved from memory of a client device 102, and that is included in the message 400.
- A message video payload 408: video data, captured by a camera component or retrieved from a memory component of the client device 102 and that is included in the message 400. In some cases, video payload 408 may include a video clip of a real-world scene modified with the addition of a virtual object attached (anchored or pinned) to a given real-world object featured in the real-world scene.
- A message audio payload 410: audio data, captured by a microphone or retrieved from the memory component of the client device 102, and that is included in the message 400.
- A message annotations 412: annotation data (e.g., filters, stickers or other enhancements) that represents annotations to be applied to message image payload 406, message video payload 408, or message audio payload 410 of the message 400.
- A message duration parameter 414: parameter value indicating, in seconds, the amount of time for which content of the message (e.g., the message image payload 406, message video payload 408, message audio payload 410) is to be presented or made accessible to a user via the messaging client application 104.
- A message geolocation parameter 416: geolocation data (e.g., latitudinal and longitudinal coordinates) associated with the content payload of the message. Multiple message geolocation parameter 416 values may be included in the payload, with each of these parameter values being associated with respect to content items included in the content (e.g., a specific image within the message image payload 406, or a specific video in the message video payload 408).
- A message story identifier 418: identifier value identifying one or more content collections (e.g., "stories") with which a particular content item in the message image payload 406 of the message 400 is associated. For example, multiple images within the message image payload 406 may each be associated with multiple content collections using identifier values.
- A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- A message sender identifier 422: an identifier (e.g., a messaging system identifier, email address, or device identifier) indicative of a user of the client device 102 on which the message 400 was generated and from which the message 400 was sent.
- A message receiver identifier 424: an identifier (e.g., a messaging system identifier, email address or device identifier) indicative of a user of the client device 102 to which the message 400 is addressed.

The contents e.g., values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
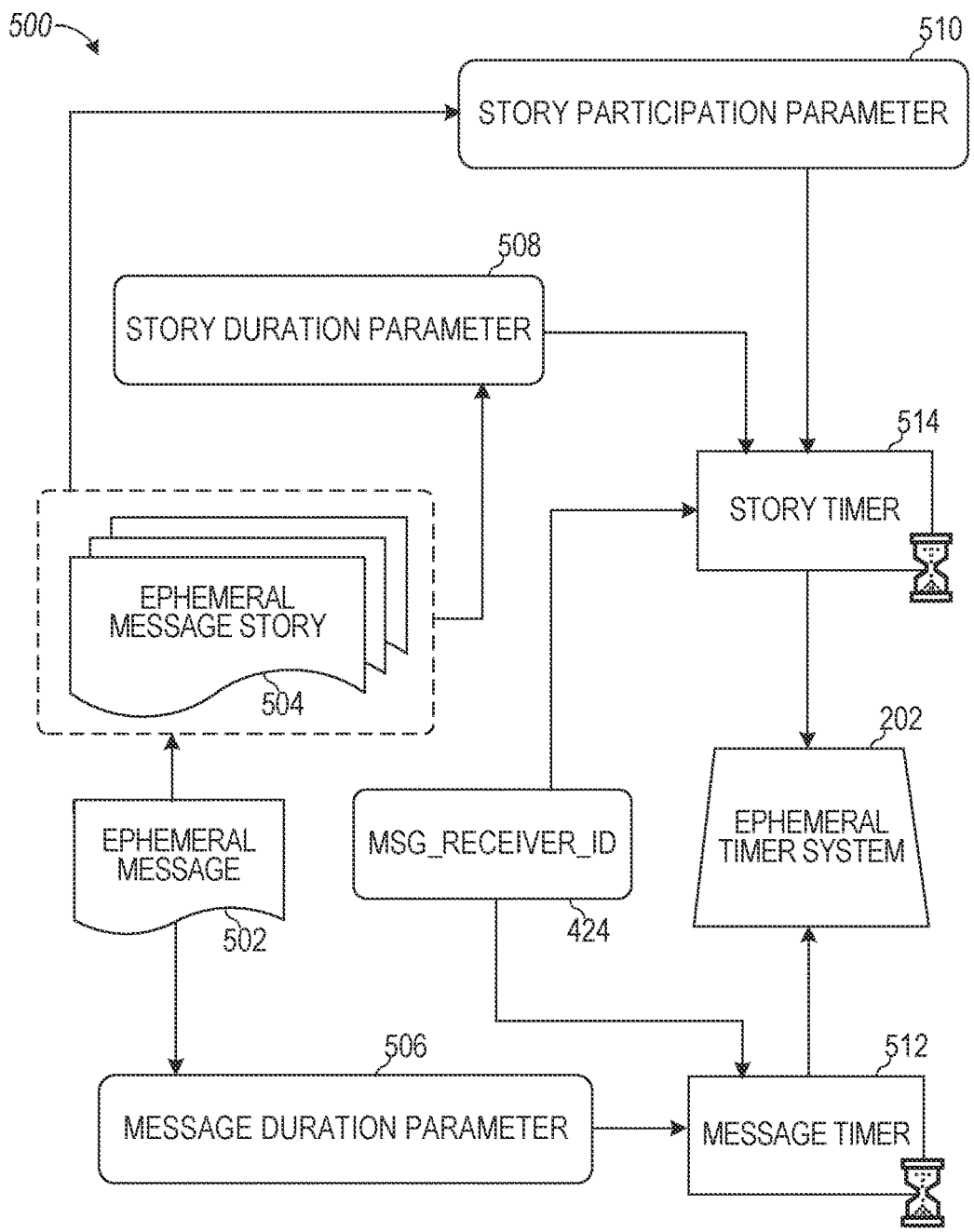
FIG. 5 is a schematic diagram illustrating an example access-limiting process, in terms of which access to content (e.g., an ephemeral message, and associated multimedia payload of data) or a content collection (e.g., an ephemeral message story) may be time-limited (e.g., made ephemeral), according to example embodiments.

FIG. 5 is a schematic diagram illustrating an access-limiting process 500, in terms of which access to content (e.g., an ephemeral message 502, and associated multimedia payload of data) or a content collection (e.g., an ephemeral message story 504), may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, where the messaging client application 104 is a application client, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message story 504 (e.g., a personal story, or an event story). The ephemeral message story 504 has an associated story duration parameter 508, a value of which determines a time-duration for which the ephemeral message story 504 is presented and accessible to users of the messaging system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504.

Additionally, each ephemeral message 502 within the ephemeral message story 504 has an associated story participation parameter 510, a value of which determines the duration of time for which the ephemeral message 502 will be accessible within the context of the ephemeral message story 504. Accordingly, a particular ephemeral message story 504 may "expire" and become inaccessible within the context of the ephemeral message story 504, prior to the ephemeral message story 504 itself expiring in terms of the story duration parameter 508. The story duration parameter 508, story participation parameter 510, and message receiver identifier 424 each provides input to a story timer 514, which operationally determines, firstly, whether a particular ephemeral message 502 of the ephemeral message story 504 will be displayed to a particular receiving user and, if so, for how long. Note that the ephemeral message story 504 is also aware of the identity of the particular receiving user as a result of the message receiver identifier 424.

Accordingly, the story timer 514 operationally controls the overall lifespan of an associated ephemeral message story 504, as well as an individual ephemeral message 502 included in the ephemeral message story 504. In one embodiment, each and every ephemeral message 502 within the ephemeral message story 504 remains viewable and accessible for a time-period specified by the story duration parameter 508. In a further embodiment, a certain ephemeral message 502 may expire, within the context of ephemeral message story 504, based on a story participation parameter 510. Note that a message duration parameter 506 may still determine the duration of time for which a particular ephemeral message 502 is displayed to a receiving user, even within the context of the ephemeral message story 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message story 504.

The ephemeral timer system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system 202 also operates to remove an ephemeral message story 504 either when the story participation parameter 510 for each and every ephemeral message 502 within the ephemeral message story 504 has expired, or when the ephemeral message story 504 itself has expired in terms of the story duration parameter 508.

In certain use cases, a creator of a particular ephemeral message story 504 may specify an indefinite story duration parameter 508. In this case, the expiration of the story participation parameter 510 for the last remaining ephemeral message 502 within the ephemeral message story 504 will determine when the ephemeral message story 504 itself expires. In this case, a new ephemeral message 502, added to the ephemeral message story 504, with a new story participation parameter 510, effectively extends the life of an ephemeral message story 504 to equal the value of the story participation parameter 510.

Responsive to the ephemeral timer system 202 determining that an ephemeral message story 504 has expired (e.g., is no longer accessible), the ephemeral timer system 202 communicates with the messaging system 100 (and, for example, specifically the messaging client application 104) to cause an indicium (e.g., an icon) associated with the relevant ephemeral message story 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

Figure 6:
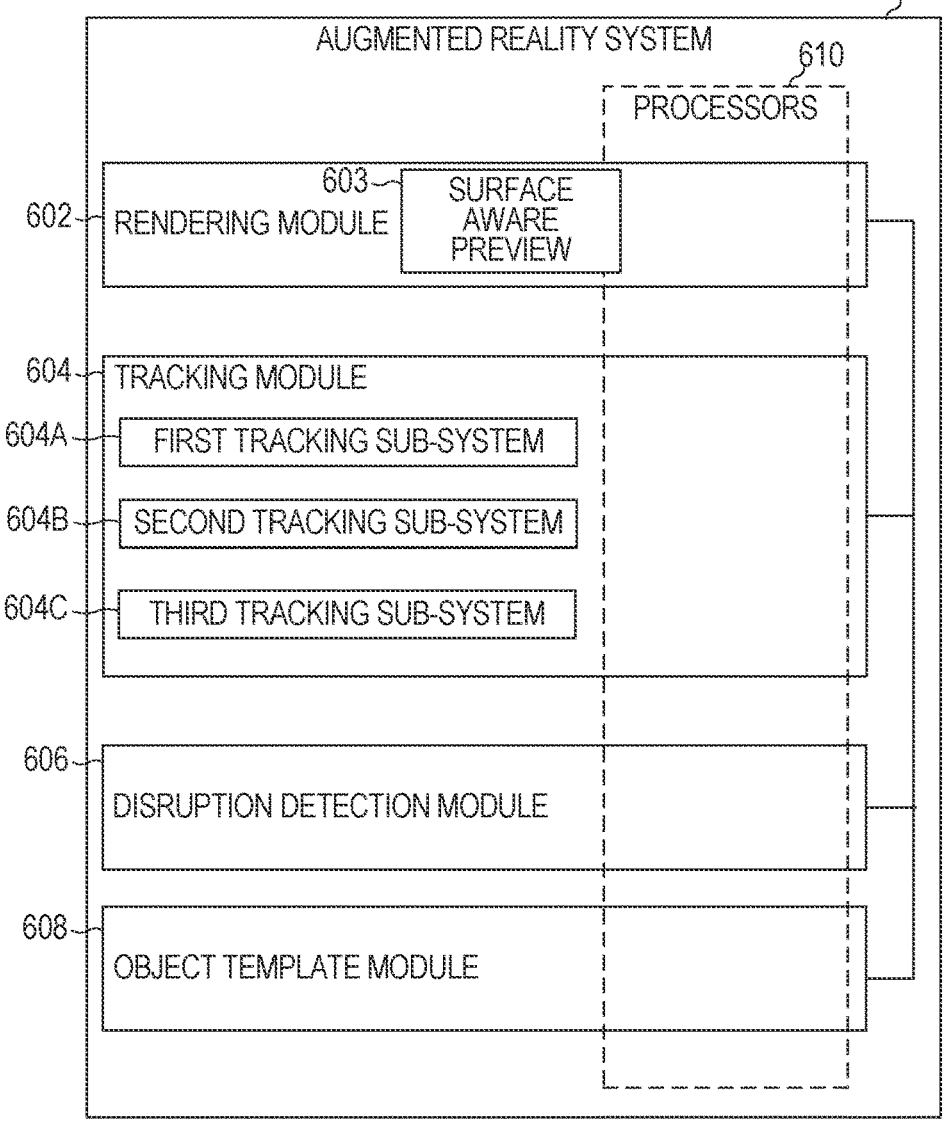
FIG. 6 is a block diagram illustrating various components of an augmented reality system, according to example embodiments.

FIG. 6 is a block diagram illustrating functional components of the augmented reality system 124 that configure the augmented reality system 124 to render virtual modifications to a three-dimensional space depicted in a video clip. For example, augmented reality system 124 renders virtual modifications to real-world surfaces in the three-dimensional space and renders virtual objects within the three-dimensional space. As shown in FIG. 6, augmented reality system 124 includes a rendering module 602, a tracking module 604, a disruption detection module 606, an object template module 608, and processors 610. In some example embodiments, the tracking module 604 may comprise a first tracking sub-system 604A, a second tracking sub-system 604B, and a third tracking sub-system 604C, wherein each tracking sub-system tracks the position of the virtual object within the three-dimensional space of a real-world object in a video clip based on a set of tracking indicia stored and associated with the video clip. The tracking indicia is obtained and stored from/on client device 102 while the camera of the client device 102 captures the video clip. In cases where the augmented reality system 124 is used to modify a video clip, the tracking indicia includes any collection of sensor information associated with the video clip as obtained from the preview generation system 125. The various components of the augmented reality system 124 may be configured to communicate with each other (e.g., via a bus, shared memory, or a switch). Although not illustrated in FIG. 6, in some embodiments, the augmented reality system 124 may include or may be in communication with a camera configured to produce a live camera feed comprising image data that includes a sequence of images (e.g., a video).

Any one or more of the components described may be implemented using hardware alone (e.g., one or more of the processors 610 of a machine) or a combination of hardware and software. For example, any component described of the augmented reality system 124 may physically include an arrangement of one or more of the processors 610 (e.g., a subset of or among the one or more processors of the machine) configured to perform the operations described herein for that component. As another example, any component of the augmented reality system 124 may include software, hardware, or both, that configure an arrangement of one or more processors 610 (e.g., among the one or more processors of the machine) to perform the operations described herein for that component. Accordingly, different components of the augmented reality system 124 may include and configure different arrangements of such processors 610 or a single arrangement of such processors 610 at different points in time.

Moreover, any two or more components of the augmented reality system 124 (or components of preview generation system 125) may be combined into a single component, and the functions described herein for a single component may be subdivided among multiple components. Furthermore, according to various example embodiments, components described herein as being implemented within a single machine, database, or device may be distributed across multiple machines, databases, or devices.

Tracking systems are subject to frequent tracking failure due to environmental conditions, user actions, unanticipated visual interruption between camera and object/scene being tracked, and so forth. Traditionally, such tracking failures would cause a disruption in the presentation of virtual objects in a three-dimensional space. For example, the virtual objects may disappear or otherwise behave erratically, thereby interrupting the illusion of the virtual object being presented within the three-dimensional space of a video. This undermines the perceived quality of the three-dimensional experience as a whole.

Traditional tracking systems rely on delivery of sensor information received in real-time from a device in a single approach (Natural Feature Tracking (NFT), Simultaneous Localization And Mapping (SLAM), Gyroscopic, etc.) to track an object in video as the video is being captured to enable a user to add virtual objects to a live scene. Such sensor information is not typically available for videos that have been previously captured. These systems leverage camera and motion sensor input data on-the-fly in augmented reality and force the user to interact with virtual objects only in the live moment as the video is being captured. These approaches significantly impact battery usage on the end-user and restrict application developers from configuring various parameters like exposure rate, white balance, camera gain, etc., which degrades the quality of the resulting footage if such footage is captured.

The augmented reality system 124 storing tracking indicia together with the video clip as the video clip is being captured provides a solution to this problem that enables the user to add a virtual object to a scene in the video clip after the video clip has been captured. The augmented reality system 124, comprising multiple redundant tracking subsystems 604A-C that enable seamless transitions between such tracking sub-systems, obtains sensor information from multiple tracking approaches stored while a video clip was captured and merges such multiple tracking approach sensor information into a single tracking system. This system is able to combine tracking virtual objects with 6DoF and 3DoF through combining and transitioning between stored sensor information from multiple tracking systems based on the availability of tracking indicia tracked by the tracking systems and/or stored by the preview generation system 125. As the indicia tracked by any one tracking sub-system becomes unavailable during capture of the video clip and therefore is not stored for the video clip, the augmented reality system 124 seamlessly switches between tracking in 6DoF and 3DoF, thereby providing the user with an uninterrupted experience. For example, in the case of visual tracking systems (e.g., NFT, SLAM), tracking indicia typically analyzed to determine orientation may be replaced with gyroscopic tracking indicia from a gyroscopic tracking system. This would thereby enable transitioning between tracking in 6Dof and 3DoF based on the availability of tracking indicia.

In some example embodiments, to transition between tracking in 6DoF and 3DoF, the augmented reality system 124 gathers and stores tracking indicia within a tracking matrix that includes translation indicia (e.g., up, down, left, right) and rotation indicia (e.g., pitch, yaw, roll). The translation indicia gathered by an NFT system may thereby be extracted from the tracking matrix and utilized when future translation indicia gathered by the NTT system become inaccurate or unavailable. In the meantime, the rotation indicia continues to be provided by the gyroscope. In this way, when the mobile device loses tracking indicia, the tracked objects that are presented in the three-dimensional space will not be changed abruptly at the frame when the tracking indicia are lost. Subsequently, when the target tracking object reappears in the screen, and a new translation $T_1$ is obtained, the translation part of the view matrix will then be taking advantage of the new translation $T_1$, and use $T_1$-$T_0$ as the translation of the view matrix.

Figure 7A:
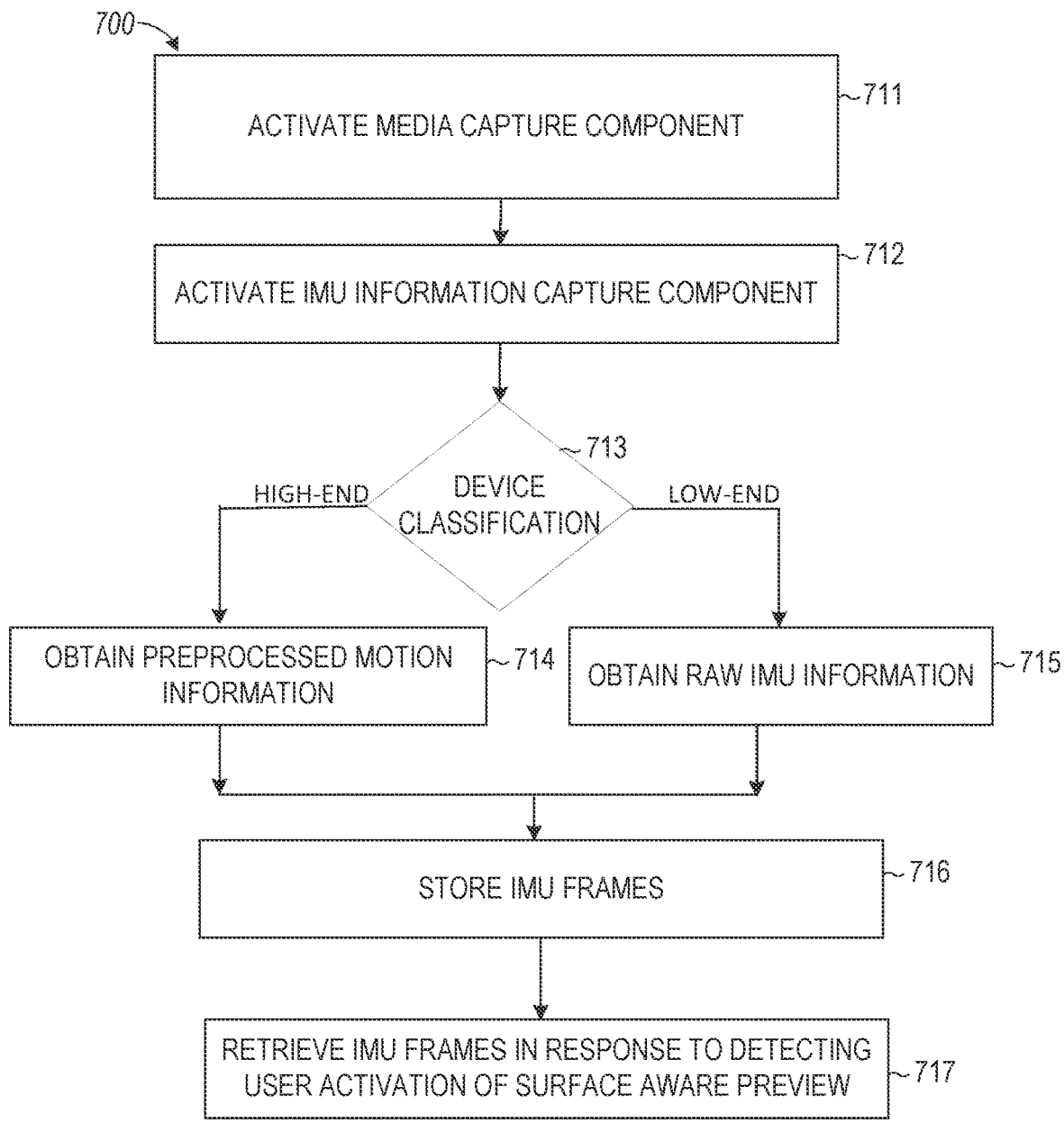
FIGS. 7A-B and 8 are flowcharts illustrating example operations of the augmented reality system in performing a process for rendering a virtual object in a video clip, according to example embodiments.

FIG. 7A is a flowchart illustrating example operations of the augmented reality system 124 in performing a process 700 for rendering a virtual object in a video clip. The process 700 may be embodied in computer-readable instructions for execution by one or more processors such that the operations of the process 700 may be performed in part or in whole by the functional components of the augmented reality system 124; accordingly, the process 700 is described below by way of example with reference thereto. However, in other embodiments at least some of the operations of the process 700 may be deployed on various other hardware configurations. The process 700 is therefore not intended to be limited to the augmented reality system 124. Process 700 may be performed by the augmented reality system 124 to capture the necessary device motion and camera frame information for enabling the addition of a virtual object to a video clip to provide the illusion of live-camera-like information environment for the added virtual object at the time of playback of the video clip.

At operation 711, a media capture component is activated. For example, a user of a mobile device may turn on the camera to begin capturing a real-world scene video, and in response, the image processing system 116 may be activated and/or the camera capture device on the user's mobile device may be activated. In an example, a video clip may be generated in response to activating the camera.

At operation 712, an inertial measurement unit (IMU) information capture component is activated. For example, tracking module 604 (FIG. 6) may be activated to obtain sensor information from the mobile device while the video clip is being captured. In an example, the IMU information capture component may be activated and left idle in the background when the media capture component is activated. When the user initiates video capture, a message to start capturing IMU data in the background is provided to the IMU capture component from the media capture component. At this point, the process proceeds to step 713 to determine the device classification.

At operation 713, a device classification is determined. For example, augmented reality system 124 may check whether the mobile device being used to capture the video clip is high-end or low-end. In some examples, high-end devices may include any device with advance video processing capabilities that include sensor processing components that are not available or not implemented by low-end devices.

At operation 714, in response to determining that the device is a high-end device, preprocessed motion information is obtained. At operation 715, in response to determining that the device is a low-end device, raw IMU information is obtained. In particular, the orientation matrix within the MU frame is kept optional based upon whether preprocessed motion information is used or not (e.g., based upon whether the device used to capture the video clip is high-end or low-end).

At operation 716, IMU frames are stored. For example, the motion information obtained at operation 714 or 715 is stored as a matrix in a motion storage device similar to the way in which video frames are stored in a video storage device. The IMU frames contain an orientation matrix of the mobile device, raw accelerometer readings, raw gyroscope readings and any other suitable sensor information available on the mobile device along with timestamp in seconds.

At operation 717, IMU frames are retrieved in response to detecting user activation of surface aware preview.

Referring back to FIG. 6, the augmented reality system 124 is configured to render and display virtual objects at a position in a three-dimensional space added in a video clip. For example, the augmented reality system 124 may maintain a set of templates to generate virtual objects to be displayed in the video clip. Upon receiving a selection of a template from among the set of templates, and a selection of a position in the video clip, the augmented reality system 124 generates and assigns the virtual object to the position within the three-dimensional space of the video clip.

The augmented reality system 124 may thereby track the position of the virtual object relative to real-world objects in the video clip in the three-dimensional space by one or more tracking systems in 6DoF. For example, the one or more tracking systems of the augmented reality system 124 may collect and analyze a set of tracking indicia (e.g., roll, pitch, yaw, natural features, etc.) in order to track the position of the virtual object relative to real-world objects in the three-dimensional space with 6DoF. In such embodiments, the augmented reality system 124 may transition between tracking systems based on the availability of the tracked indicia to maintain consistent tracking in 6DoF.

The augmented reality system 124 is configured to pair spatial audio/music, in addition to or instead of a virtual object, with a video clip. Such paired audio/music may have stereo properties of the additive sound change to match directional changes within the video clip. For example, a user can add audio/music to a real-world object (a person or tree) and as the camera angle in the video clip moves towards/away or pans left/right from the real-world object, the volume and direction of the sound of the added audio/music change to give the user the illusion that the audio/music are also being moved toward/away or left/right from the camera.

Upon detecting an interruption of one or more indicia from among the set of indicia tracked, such that tracking in 6DoF becomes unreliable or impossible, the augmented reality system 124 transitions to tracking the virtual object in the three-dimensional space in 3DoF in order to prevent an interruption of the display. For example, the augmented reality system 124 may transition from a first tracking system (or first set of tracking systems among the set of tracking systems) to a second tracking system among the set of tracking systems (or second set of tracking systems), wherein the second tracking system is capable of tracking the virtual object with 3DoF in the three-dimensional space, based on the tracking indicia available.

In some example embodiments, the set of tracking systems of the augmented reality system 124 includes a gyroscopic tracking system, an NFT system, and well as a SLAM tracking system, Each tracking system among the set of tracking systems may analyze tracking indicia in order to track a position of a virtual object within a three-dimensional space. For example, to track a virtual object with 6DoF, the augmented reality system 124 may require at least six tracking indicia to be available. As tracking indicia become obstructed or unavailable for various reasons, the augmented reality system 124 may transition between the available tracking systems among the set of tracking systems in order to maintain 6DoF, or transition to 3DoF if necessary.

It will be readily appreciated that these augmented reality systems 124 serve to provide consistent rendered virtual objects in real-world three-dimensional spaces in a wide variety of environments and situations. In many applications it can be desirable to provide firm consistency for the positions of these virtual objects within a video clip of a real-world scene. This can involve the recognition and use of a specific, fixed reference point (e.g., a fixed surface or object) in the real-world scene.

To ensure firm consistency in the location of virtual objects, annotation data in the example form of a presentation "lens" that is specific for the three-dimensional object tracking and rendering in a video clip described herein may be employed. In particular, a surface aware preview 603 is a presentation lens that identifies and references a real-world surface (e.g., the ground or a moving object, such as a person) for the consistent rendering and presentation of virtual objects in the video clip. Surface aware preview 603 may be a presentation lens that is activated when a user is previewing a given video clip and activates a virtual object insertion feature by pressing a suitable button or swiping in a given direction across the screen or providing any other suitable input (verbal or gesture). As shown, the surface aware preview 603 can be a specific portion or submodule within a rendering module 602 of an overall augmented reality, system 124, as set forth above. This surface aware preview 603 of the rendering module 602 can be configured to recognize a reference surface based on frames of the video clip, and may also utilize other device inputs (e.g., gyroscope, accelerometer, compass) to determine movement information associated with the reference surface depicted in the video clip. In some implementations, the reference surface is a surface nearest to a location on the screen where the user placed the virtual object, and in other implementations, the reference surface is a default surface (e.g., an object in the center of the screen). Once the reference surface has been determined, then virtual object rendering and surface modification can be accomplished with respect to that reference surface along with dynamic repositioning of the virtual object throughout the video clip.

In some embodiments, when the user activates the surface aware preview 603 to add a virtual object to a video clip, augmented reality system 124 determines whether preprocessed device motion data is available or raw MU data is available. Specifically, augmented reality system 124 determines what type and quality of motion information is available based on the classification of the device used to capture the video clip and motion information. If raw IMU data is available, such data is filtered to obtain device motion data. Each camera frame is decoded and smoothed using an image processing component. In order to correlate information from the IMU frame with the information from the camera frame (or video clip frame), bilinear interpolation of the two closest IMU frames is performed to generate a paired IMU frame for each camera frame timestamp. In particular, the timestamps from the camera frame in the video clip may not match the timestamps in the IMU frames. A close approximation of the IMU frames matching a given video clip frame may be provided using the bilinear interpolation technique. The resulting IMU frame contains the 3DoF pose which provides the device orientation and acceleration data along with direction of gravity for each video frame.

The 3DoF pose along with the video clip frame is provided to a surface tracking component of the augmented reality system 121 where features or key points of interest in the video clip frame are extracted and tracked to determine the way they move across video clip frames fusing the orientation information from the 3DoF pose to generate a resulting 6DoF pose. Exemplary details of how this fusion can be performed is described in Benezra et al. U.S. Pub. 2018/0061072, entitled "Systems and methods for simultaneous localization and mapping," which is incorporated herein by reference in its entirety.

The 6DoF pose from the surface tracking component is then provided to rendering module 602 in order to position the camera such that the virtual objects are rendered as if they were placed in the real-world during the original video capture. Rendering module 602 synchronizes changes in the placement and post of the virtual object with changes in the camera position and orientation in the captured scene.

In particular, the surface aware preview 603 may utilize object recognition to identify a set of real-world objects present in a frame of a video clip into which a user desires to add a virtual object. Surface aware preview 603 may draw circular, rectangular, or free-form boundaries around each of the identified real-world objects. Surface aware preview 603 may determine whether a location at which the virtual object was added on the screen intersects or falls within a majority of the boundary surrounding a given real-world object. If the virtual object location overlaps boundaries of two or more real-world objects, surface aware preview 603 may compute an amount of each boundary the virtual object overlaps. Surface aware preview 603 may compare the amount of overlap of each of the real-world objects and select a target real-world object to track the real-world object with the greatest overlap by the virtual object.

After surface aware preview 603 selects the target real-world object to track, surface aware preview 603 tracks the position of the real-world object throughout the video clip. Surface aware preview 603 may utilize stored sensor information associated with each frame of the stored video clip to determine the position of the real-world object. For example, surface aware preview 603 may determine that a position of the target real-world object changes throughout the video clip and that the accelerometer and GPS information indicates that a position of the camera, used to capture the video of the target real-world object, did not change. Based on this information, surface aware preview 603 may determine the target real-world object is a moving object (e.g., a person walking or car driving) in the video clip and is not a stationary object. In such circumstances, if the virtual object is attached (e.g., pinned) to the moving object, surface aware preview 603 may modify the position of the virtual object throughout the video clip to match the movement of the target real-world object (e.g., the position of the virtual object can change in the same direction as the target real-world object and at the same rate at which the position of the real-world object changes).

In another example, surface aware preview 603 may determine that a position of the target real-world object does not change throughout the video clip and that the accelerometer and (IPS information indicates that a position of the camera, used to capture the video of the target real-world object, changes. Based on this information, surface aware preview 603 may determine that the target real-world object is a stationary object. In this circumstance, if the virtual object is attached (e.g., anchored) to the target real-world object, the surface aware preview 603 may change the position of the virtual object in opposition to the changes of the camera. In particular, surface aware preview 603 may determine that the camera pans to the right, causing the target real-world object to move to the left off of the screen throughout the video clip. Surface aware preview 603 may compute the rate at which the camera pans to the right, based on the sensor information stored with the video clip, and may change the position of the virtual object to the left at the same rate as the camera pans to the right until the virtual object moves off of the screen together with the target real-world object.

In another example, surface aware preview 603 may determine that a position of the target real-world object changes throughout the video clip and that the accelerometer and GPS information indicates that a position of the camera, used to capture the video of the target real-world object, also changes. Based on this information, surface aware preview 603 may determine that the target real-world object is a moving object and is being captured by a camera that is also panning towards or away from the real-world object. In this circumstance, if the virtual object is attached to the target real-world object, the surface aware preview 603 may change the position of the virtual object in opposition to the changes of the camera and in accordance with the movement of the real-world object. In particular, surface aware preview 603 may determine, based on the stored sensor information, that the camera pans to the right faster than the target real-world object moves towards the same direction. This causes the target real-world object to move to the left off of the screen throughout the video clip at a rate lower than the rate of movement of the target real-world object and particularly at a rate that is a difference between a rate of movement of the camera and a rate of movement of the target real-world object. Surface aware preview 603 may change the position of the virtual object to the left at the computed rate as the camera pans to the right until the virtual object moves off of the screen together with the target real-world object.

The use of such a surface aware preview 603 as part of an overall virtual rendering can result in presentations that are more dynamically convincing even as one or more object positions or the camera angle change throughout the video clip. Various operations for adding a virtual object to a video clip and graphics of how such virtual object presentations can appear while using a surface aware preview 603 are provided below by way of example.

Figure 7B:
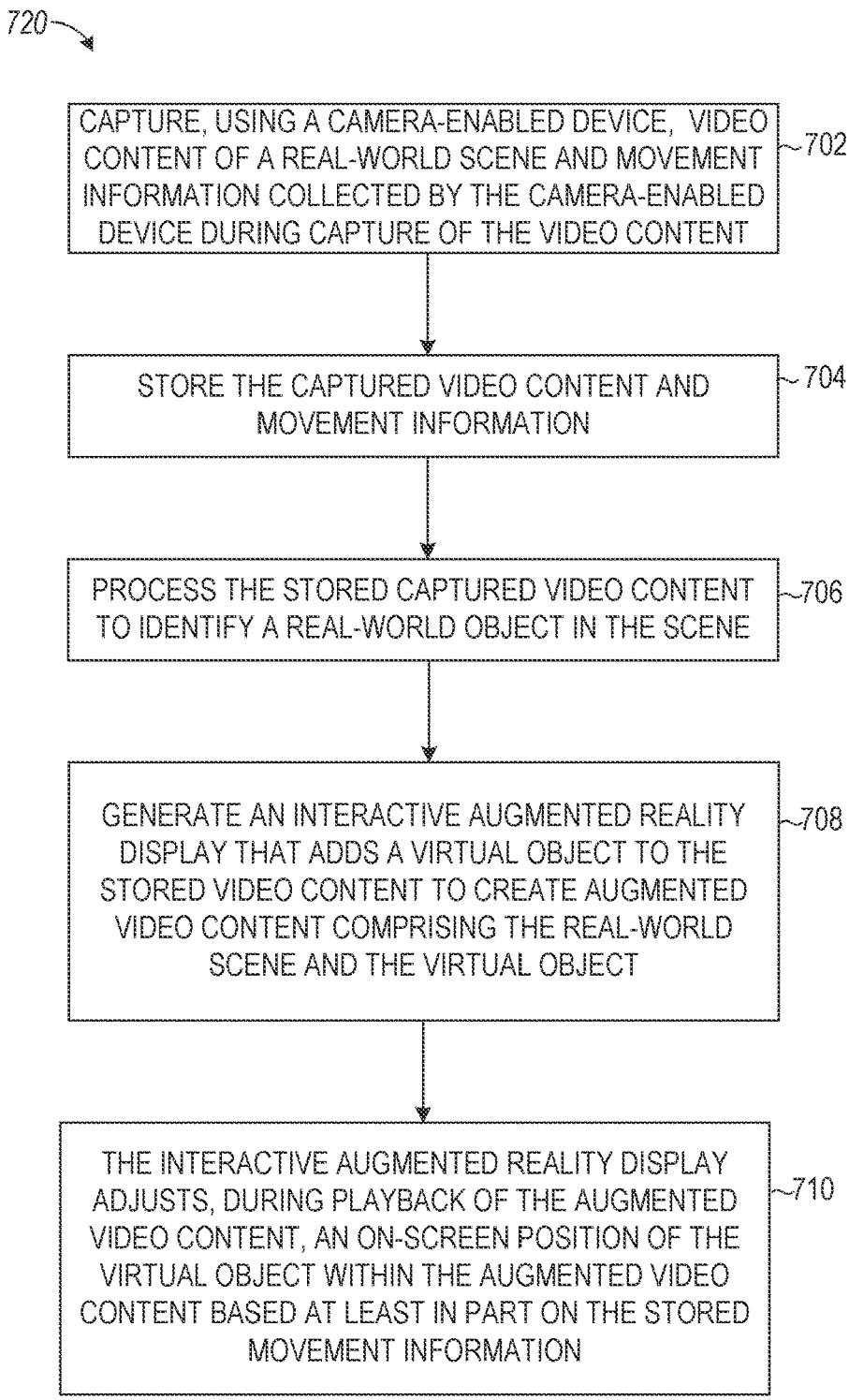

FIG. 7B is a flowchart illustrating a process 720 for rendering a virtual object in a video clip using a surface aware preview 603, according to various embodiments of the present disclosure. The process 720 may be embodied in computer-readable instructions for execution by one or more processors such that the operations of the process 720 may be performed in part or in whole by the functional components of the augmented reality system 124; accordingly, the process 720 is described below by way of example with reference thereto. However, in other embodiments, it shall be appreciated that at least some of the operations of the process 720 may be deployed on various other hardware configurations and the process 720 is not intended to be limited to the augmented reality system 124.

Figure 10:
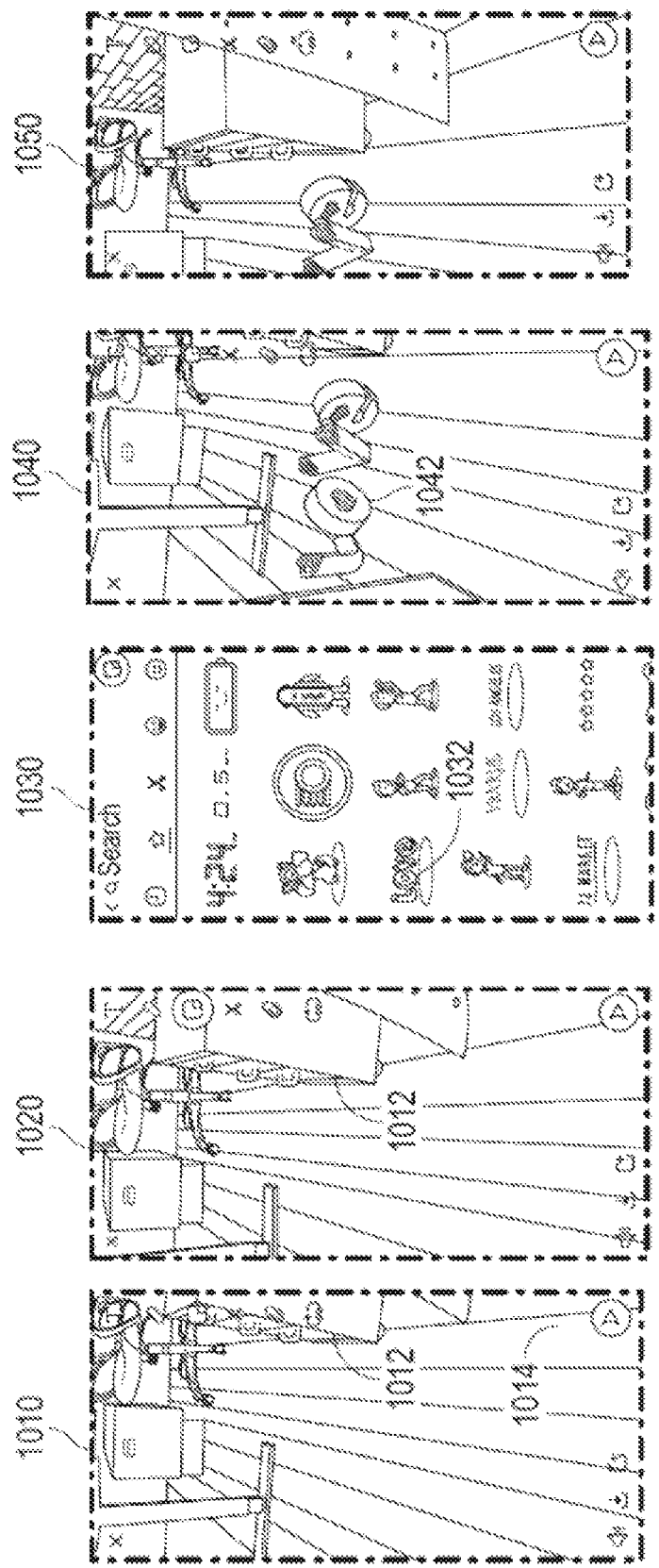
FIGS. 10 and 11 are diagrams depicting an object rendered within a three-dimensional space by an augmented reality system, according to example embodiments.

As depicted in operation 702, the augmented reality system 124 communicates with the preview generation system 125 to capture, using a camera-enabled device, video content of a real-world scene and movement information collected by the camera-enabled device during capture of the video content. For example, a user device may instruct preview generation system 125 to record a segment of video of a predetermined or user-selected length. The preview generation system 125 may store the video as a video clip and obtain sensor information from the user device associated with each frame of the video clip. For example, as shown in FIG. 10, a short video clip is captured as illustrated by the sequence of images 1010 and 1020 illustrating a given real-world object 1012 (e.g., a filing cabinet) moving into the screen from image 1010 to image 1020 as the camera pans to the right. Sensor information (e.g., a gyroscope sensor) may detect that the camera being used to capture the video clip containing frames with images 1010 and 1020 is panning to the right to cause the real-world object 1012 to move into the screen from right to left.

At operation 704, the augmented reality system 124 communicates with the preview generation system 125 to store the captured video content and, movement information. For example, after the video clip is captured by the preview generation system 125, the video clip and the sensor information are stored and indexed in database 120.

At operation 706, the augmented reality system 124 communicates with the preview generation system 125 to process the stored captured video content to identify a real-world object in the scene. For example, the augmented reality system 124 processes the frames of the video clip to identify a set of real-world objects shown in images 1010 and 1020, such as the floor 1014 and the real-world object 1012. The augmented reality system 124 in this embodiment draws boundaries for each identified object. In some embodiments, the augmented reality system 124 performs operation 706 in response to receiving a user request to modify the video clip. For example, a user may press a suitable button (e.g., a creative tools button to reveal a set of stickers) and in response to selection of this button, the captured video is processed to identify the objects in the video clip and track their positions and movement throughout the video clip using the sensor information.

At operation 708, the augmented reality system 124 communicates with the preview generation system 125 to generate an interactive augmented reality display that adds a virtual object to the stored video content to create augmented video content comprising the real-world scene and the virtual object. In one aspect, the augmented reality system 124 generates a graphical user interface for presentation to a user while previewing a given video clip. The graphical user interface may enable a user to drag and drop a virtual object onto a frame in the video clip being previewed to attach the virtual object to a real-world three-dimensional object featured in the video clip. For example, the graphical user interface may enable a user to drag a given virtual object and pin or anchor the virtual object to a stationary or moving real-world object (e.g., a moving person or the ground). The graphical user interface, in this way, allows the user to augment the video clip with one or more virtual objects. The video clip can play from the beginning featuring the added virtual object throughout the video clip attached to the real-world object.

In one aspect, the augmented reality system 124 provides a graphical user interface for receiving user input to add virtual objects to augment a video clip. The graphical user interface may include a toolbar or pane (which may be partially transparent or may be opaque). The toolbar or pane may present, in the graphical user interface, a plurality of virtual objects by way of icons for each virtual object. The user can interact with the toolbar or pane to select a given virtual object for placement in the video clip. Once placed in the video clip, the graphical user interface allows the user to move the virtual object around a given frame to attach the virtual object to a three-dimensional real-world object featured in the video clip. The video clip can play from the beginning featuring the added virtual object throughout the video clip attached to the real-world object. In this way, the graphical user interface generates an augmented reality display that includes the selected virtual object attached (anchored or pinned) to a real-world object.

For example, a user can use two fingers and drag the virtual object on the y-axis. This will result in moving the virtual object on the y-plane (vertical) while keeping the depth the same on the z-axis. The user can press on the virtual object for a threshold period of time to pin the virtual object to the pixel of the corresponding video frame. Pinning the virtual object instructs the augmented reality system 124 to track the camera frame pixels across video clip frames and provide relative position and orientation of the pixels with respect to reference pixels across frames, moving and scaling the virtual object as the corresponding video pixels move and scale. In some embodiments, when the user presses on the video clip frame for a threshold period of time, the video playback is paused and the user can drag the virtual object to any pixel on the paused video frame. When the user releases the pressed finger, the virtual object is locked to the pixels at the touch position in the related video footage and the augmented reality system 124 begins to track the pixels across frames as they move around the screen and updates the virtual object position to match. Because the augmented reality system 124 has information about the 3D pose of the virtual object, the y-axis rotation of the virtual object can change to match changes in the real-world scene, making the integration of the virtual object feel more realistic to the user.

In some examples, the user can tap on any part of the video during playback to place the virtual object at the touch target. This makes it fast and easy to place content in different parts of a scene.

For example, while the video clip is being previewed, a user selection of the creative tools button may be received to modify the video clip. In response to this selection, the preview of the video clip is paused at the frame at which the selection was received and a set of virtual object icons (e.g., three-dimensional objects) is presented to the user for selection of a virtual object. The virtual object icons in some embodiments are presented in an interactive toolbar (e.g., a vertical or horizontal slider) on one or more edges of the paused frame so that the paused frame remains in view. In such cases, the user can touch a given one of the icons and drag the icon into the frame that is in view to add the corresponding virtual object to the given location in the frame, or may tap the icon to position the icon in a default location on the frame. Alternatively, in another embodiment the icons are presented in a full screen overlaid on top of the frame, as shown in image 1030, and the user selects the virtual object to add by tapping on the virtual object icon. Image 1030 provides an illustrative example of a full screen view of a set of virtual object icons being shown to the user for selection to add to the video clip. Each virtual object that is three-dimensional is indicated in the full screen or toolbars by having a circular ground shadow 1032 underneath the given virtual object. Virtual objects that are not three-dimensional do not include a ground shadow in the list of icons.

In some implementations, after the user selects a given one of the virtual objects from the list of icons (e.g., the icons shown in the full screen approach illustrated in image 1030), the set of virtual object icons shown in the toolbar or full screen is closed, and the selected virtual object is placed on top of the paused video clip frame. For example, the virtual object 1042 shown in image 1040 has been attached to the real-world floor 1014 featured in the video clip. In some implementations, after the user selects a given virtual object from the set of icons, the virtual object is added to the first frame of the video clip rather than the paused frame. In either case, after the user adds the virtual object to the video clip, the video clip automatically rewinds at a predetermined rate (e.g., 2× rewind) to the beginning of the video clip and automatically starts playing again repeatedly from start to finish featuring the added virtual object.

In some implementations, if the user taps on the virtual object 1042 after the virtual object has been added, the virtual object 1042 is removed or deleted from the video clip. Alternatively, the user can remove the virtual object 1042 from the video clip by touching and holding the virtual object for a threshold time period and then dragging the virtual object 1042 to a trash can icon displayed on the screen.

In some circumstances, the video clip may already include a virtual object before the user selected a new virtual object to add. In such cases, the previously added virtual object is replaced with the most recently selected virtual object. The most recently selected virtual object may retain all the properties of the previously added virtual object (e.g., position, image scale, size, etc.). The most recently selected virtual object may automatically be attached to the same real-world object to which the previous virtual object was attached. Alternatively, the most recently selected virtual object may be added to the video clip that already contains the virtual object. In such circumstances, the video clip is played back with multiple virtual objects being presented.

Figure 11:
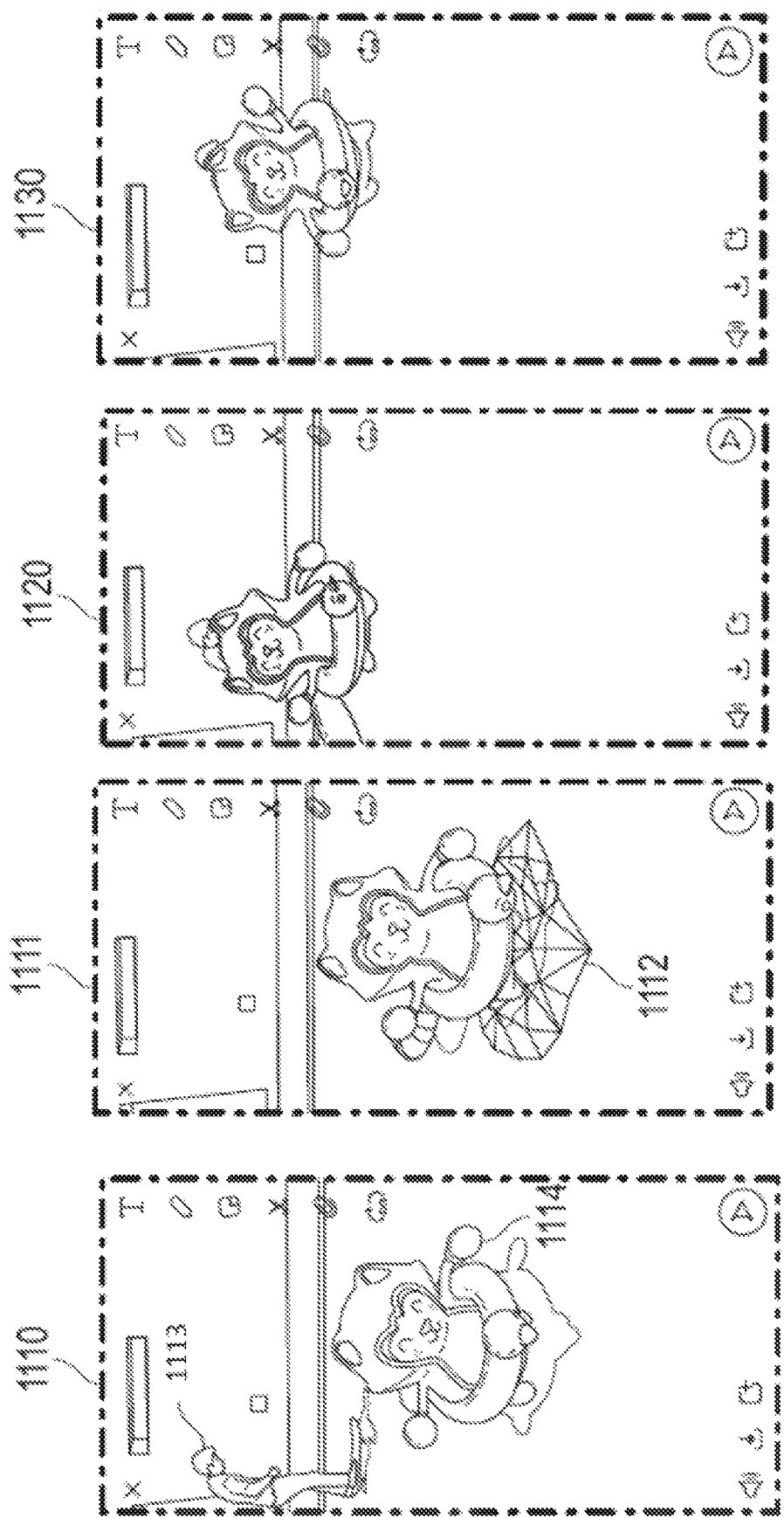

After the virtual object is added to a video clip, the virtual object can be modified or manipulated in various ways in 3DoF or 6DoF. Examples of how virtual objects can be manipulated are discussed in commonly-owned, commonly-assigned U.S. patent application Ser. No. 15/581,994, filed Apr. 28, 2017, entitled "AUGMENTED REALITY OBJECT MANIPULATION", which is hereby incorporated by reference in its entirety. In some embodiments, after the virtual object is added to the video clip, the augmented reality system 124 detects a first user input that touches the virtual object (e.g., a user's finger touches an area of the screen where the virtual object is shown). In particular, in some embodiments, the augmented reality system 124 draws a boundary around the virtual object and detects the first user input that touches an area within the boundary of the virtual object. The augmented reality system 124 further detects receipt of a second user input that drags the virtual object within a threshold period of time (e.g., 0.5 seconds) of the first user input (e.g., the user holds their finger on the screen and slides their finger in a direction of interest to drag the virtual object). If the second user input is not received within the threshold period of time, the placement of the virtual object remains as it was before receiving the first user input and the video clip resumes playback. In response to detecting receipt of the second user input within the threshold period of time of the first user input, augmented reality system 124 pauses the video clip playback and adds a circular ground grid underneath the virtual object to indicate that the state of the virtual object has been changed. In particular, the circular ground grid indicates to a user a mode change from the virtual object being attached to the real-world object to becoming manipulable. Image 1111 in FIG. 11 illustrates a ground grid 1112 indicating such a mode change. In particular, in this mode, the augmented reality system 124 calculates the z-axis position of the virtual object and projects the position on the ground surface in the form of ground grid 1112 indicating the virtual object is moveable.

The augmented reality system 124 may manipulate the virtual object in three-dimensional space based on inputs described in Table 1 below as long as the user's finger remains on top of the virtual object location. To manipulate the virtual object in three-dimensional space, the virtual object's z-axis position may be determined by the assumed ground plane at the frame of placement or the ground plane of the target object, as indicated by the ground grid 1112.

| | A | B | C | D |
|---|---|---|---|---|
| 1 | | X Axis | Y Axis | Z Axis |
| 2 | Position/ Translation | Single finger touch object and drag left/right | Two finger touch object and drag on Y axis | Single finger touch object and drag forward/backward (touch moving on Y axis) |
| 3 | Rotation | N/A | N/A | Two finger rotation turning clockwise or counter-clockwise |
| 4 | Scale | Pinch-in/pinch-out will uniformly scale 3D object, with affordance to indicate Max and Min scale | | |

In some cases, the virtual object may occupy a majority of the screen. In such cases, the augmented reality system 124 receives a user input that taps the virtual object, and in response, the augmented reality system 124 places the virtual object further back on the z-axis (e.g., into the screen) making it easier to select and manipulate the virtual object.

By default, a virtual object is attached to the target real-world object overlapped by the virtual object that is added to the screen. To pin the virtual object to a different real-world object, the augmented reality system 124 receives a single user input that presses and holds the virtual object for at least the threshold period of time (e.g., 0.5 seconds), In response, the augmented reality system 124 scales up the virtual object to indicate the change in state (e.g., the virtual object is popped) and enables the user to manipulate the virtual object in two-dimensional space to attach the virtual object to a different real-world object featured in the scene. In particular, by popping up or scaling up the virtual object, the augmented reality system 124 indicates a mode change to the user in which the virtual object becomes manipulable in two-dimensional space. This is in contrast to the mode change indicated by the circular ground grid 1112 which indicates that the virtual object becomes manipulable in three-dimensional space relative to a real-world object or ground plane.

The manner of manipulating the virtual object in two-dimensional space may be performed in accordance with the inputs defined by Table 2 below. In response to detecting that the user's finger has been lifted or released from the virtual object and is no longer touching the virtual object, the augmented reality system 124 attaches (e.g., pins) the virtual object to the new real-world object overlapped by the new location on the screen of the virtual object. The augmented reality system 124 communicates with the preview generation system 125 to rewind the video clip (e.g., at a rate of −2.0) to the beginning to show the video clip with the virtual object in the new position attached to the new real-world object,

| | A | B | C | D |
|---|---|---|---|---|
| 1 | | X Axis | Y Axis | Z Axis |
| 2 | Position/Translation | Single finger touch object and drag left/right | Single finger touch object and drag up/down | N/A |
| 3 | Rotation | N/A | N/A | N/A |
| 4 | Scale | Pinch-in/pinch-out will uniformly scale object, with affordance to indicate Max and Min scale | | |

After the virtual object is added to the video clip, visual attributes of the virtual object can be adjusted. For example, the augmented reality system 124 can add geofilters, stickers, captions, and paint to the virtual object. In particular, augmented reality system 124 may receive a user input that swipes left/right across a portion of the screen without intersecting a virtual object. For example, the virtual object may be positioned at the bottom of the screen and the user may swipe across the top of the screen. In response, a list of available geofilters is presented for the user to select and the augmented reality system 124 modifies the video clip based on the selected geofilter. If the user input swipes left/right intersecting a virtual object, the virtual object is selected and the geofilters are not presented. In some implementations, one or more two-dimensional stickers, images, or captions or paint may be presented in the video clip. If the user taps a given two-dimensional sticker, image, or caption or paint without touching the virtual object, the two-dimensional sticker, image, or caption or paint can be changed or placed in the video clip; otherwise, if the user taps a region overlapping the virtual object, the virtual object is selected for manipulation. Selection of a sticker, image, or caption or paint causes the augmented reality system 124 to place the sticker, image, or caption or paint on top of the virtual object by default. The user can tap the stickers, images, or captions or paint region in the video clip to manipulate the stickers, images, or captions or paint.

At operation 710, the augmented reality system 124 communicates with the preview generation system 125 for the generated interactive augmented reality display to adjust, during playback of the augmented video content, an on-screen position of the virtual object within the augmented video content based at least in part on the stored movement information. For example, the augmented reality system 124 determines that the target real-world object moves off of the screen in the video clip such that its position moves from right to left off the screen as the camera pans to the right. The augmented reality system 124 determines the rate at which the target real-world object position changes and similarly adjusts the position of the virtual object to match the rate and position change of the real-world object. The sequence of images 1040 and 1050 illustrate the added virtual object position changing in the screen as the video clip plays. In particular, the virtual object 1042 moves from the center of the screen to the left of the screen and slightly off of the screen together with the target real-world floor 1014 to which the virtual object 1042 is anchored.

Figure 8:
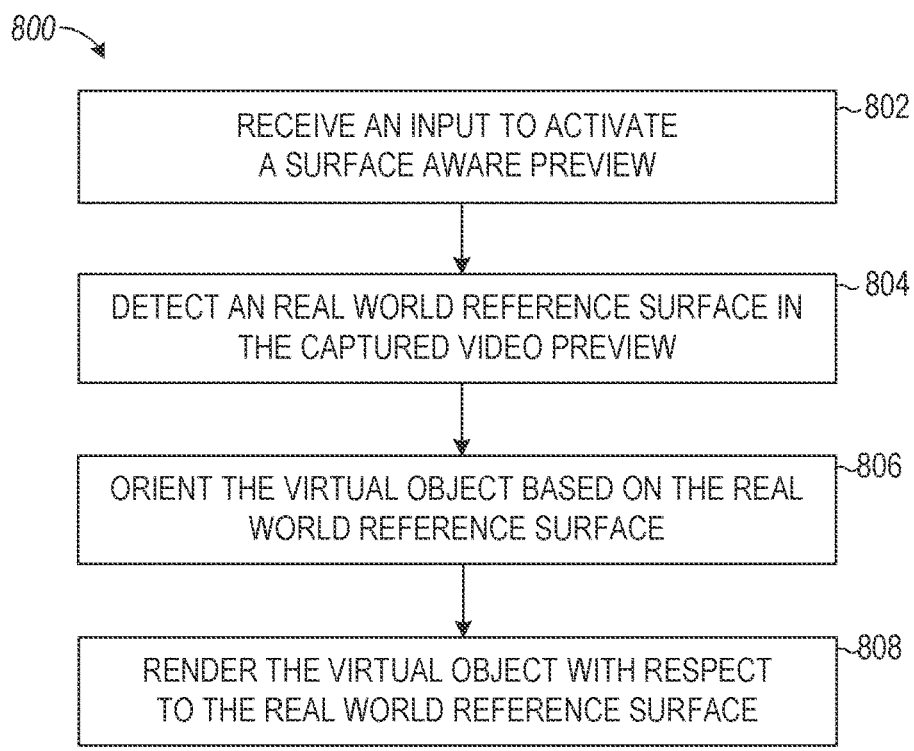

FIG. 8 is a flowchart illustrating operations of the augmented reality system 124 in performing a process 800 for rendering a virtual object in a video clip, according to certain example embodiments. The process 800 may be embodied in computer-readable instructions for execution by one or more processors such that the operations of the process 800 may be performed in part or in whole by the functional components of the augmented reality system 124; accordingly, the process 800 is described below by way of example with reference thereto. However, it shall be appreciated that at least some of the operations of the process 800 may be deployed on various other hardware configurations, and the process 800 is not intended to be limited to the augmented reality system 124.

At operation 802, an input is received to active a surface-aware preview. For example, preview generation system 125 may receive a user input that generates a preview of a video clip and that selects an icon for modifying the video clip. This activates the augmented reality system 124 and instructs the augmented reality system 124 to process the real-world objects in the video clip and sensor information associated with the video clip to track positions of the real-world objects.

At operation 804, a real-world reference surface is detected in the captured video preview. For example, in the illustrative video clip shown in FIG. 11, the augmented reality system 124 processes an image or frame 1110 of the video clip to detect a number of real-world objects. One such real-world object can be a person 1113 featured in the real-world scene. Boundaries may be drawn around the real-world object.

At operation 806, the virtual object is oriented based on the real-world reference surface. For example, the augmented reality system 124 allows a user to position a virtual object 1114 in the video clip. The augmented reality system 124 allows the user to manipulate the virtual object to position the virtual object over the person 1113. The augmented reality system 124, in one embodiment, presents an image 1111 showing a ground grid 1112 indicating a mode change associated with the virtual object. Specifically, ground grid 1112 indicates to a user that the virtual object can be manipulated. The augmented reality system 124 receives inputs from the user manipulating the virtual object 1114 in three-dimensional space relative to the person 1113 or in two-dimensional space on the screen. In one implementation, the augmented reality system 124 may receive user input that pins the virtual object 1114 to the person 1113.

At operation 808, the virtual object is rendered with respect to the real-world reference surface. For example, as shown in the sequence of images 1120 and 1130, the virtual object 1114 pinned to the person 1113 moves toward the right of the screen as the person 1113 moves towards the right of the screen.

Figure 9:
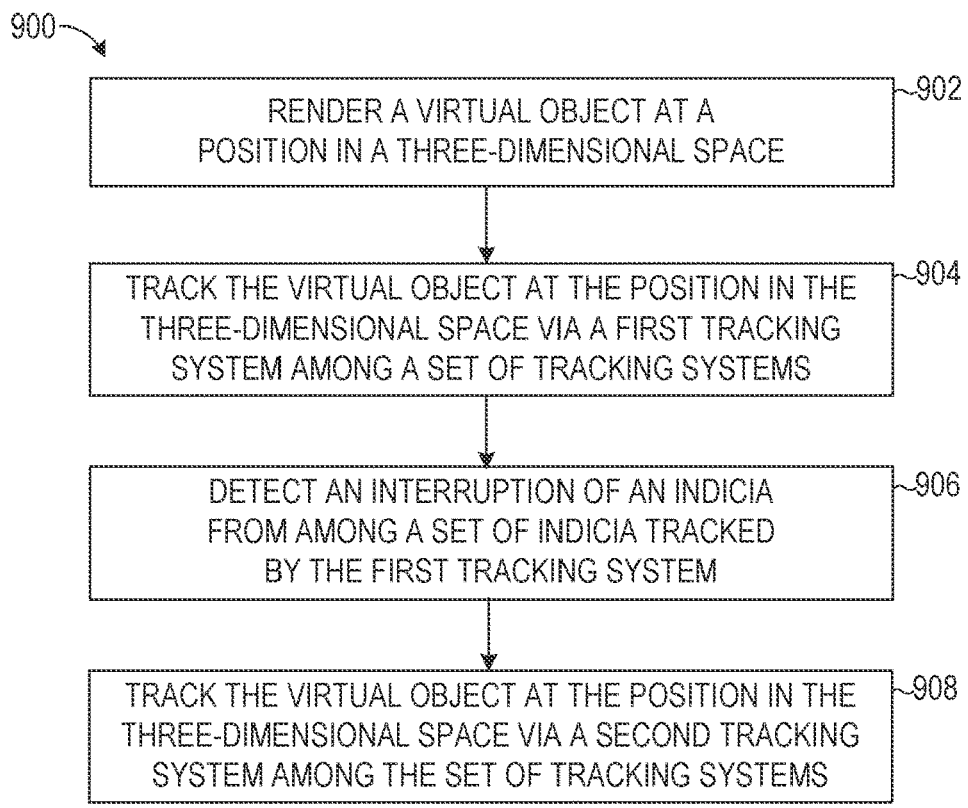
FIG. 9 is a flowchart illustrating example operations of the augmented reality system in performing a process for tracking an object rendered in a video clip, according to example embodiments.

FIG. 9 is a flowchart illustrating operations of the augmented reality system 124 in performing a process 900 for tracking an object at a position relative to a target real-world object in a video clip, according to certain example embodiments. The process 900 may be embodied in computer-readable instructions for execution by one or more processors such that the operations of the process 900 may be performed in part or in whole by the functional components of the augmented reality system 124; accordingly, the process 900 is described below by way of example with reference thereto. However, it shall be appreciated that at least some of the operations of the process 900 may be deployed on various other hardware configurations and the process 900 is not intended to be limited to the augmented reality system 124.

At operation 902, the rendering module 602 renders a virtual object at a position relative to a target real-world object in a three-dimensional space. The virtual object may include interactive content generated by the user based on user-provided parameters.

At operation 904, the tracking module 604 tracks the virtual object in 6DoF at the position in the three-dimensional space of the target real-world object via the first tracking sub-system 604A, or a combination of multiple tracking sub-systems (e.g., the first tracking sub-system 604A and the second tracking sub-system 604B), based on a set of tracking indicia stored for the video clip obtained while the video clip was being captured. When tracking the virtual object in 6DoF, a user viewing the object on the client device 102 can turn or move in any direction without disrupting the tracking of the object. For example, the tracking module 604 may track the position of the virtual object based on a combination of an NET system and a gyroscopic tracking system.

At operation 906, the disruption detection module 606 detects an interruption of a tracking indicia from among the tracking indicia tracked by the tracking sub-systems (e.g., the first tracking sub-system 604A). For example, the first tracking sub-system 604A may include a NFT system configured to rely on tracking indicia that include features of an environment or active light sources in proximity to annotated virtual objects within the environment (e.g., the ground's plane, or the horizon). The NET system of the first tracking sub-system 604A may therefore rely on the positions of three or more known features in the environment to determine the position of the virtual object relative to the target real-world object in the three-dimensional space. Should any one or more of the tracking indicia tracked by the first tracking sub-system 604A become obstructed or unavailable, the tracking of the virtual object in the three-dimensional space would become disrupted.

At operation 908, in response to the disruption detection module 606 detecting a disruption of one or more tracking indicia, the tracking module 604 transitions to one or more other tracking sub-systems (e.g., the second tracking sub-system 604B and/or the third tracking sub-system 604C) to maintain tracking of the virtual object relative to the target real-world object in the three-dimensional space. In particular, tracking module 604 obtains, from storage, sensor information of a different type associated with the video clip. In doing so, the augmented reality system 124 may transition from 6DoF to 3DoF, wherein 3DoF measures pitch, roll, and yaw, but does not measure translations. As the tracking indicia again become available, the augmented reality system 124 may thereby transition from 3DoF back to 6DoF. For example, when the NET system becomes unavailable, the tracking module 604 may utilize the last tracking indicia gathered and tracked by the NFT system throughout the subsequent 3DoF experience.

Figure 12:
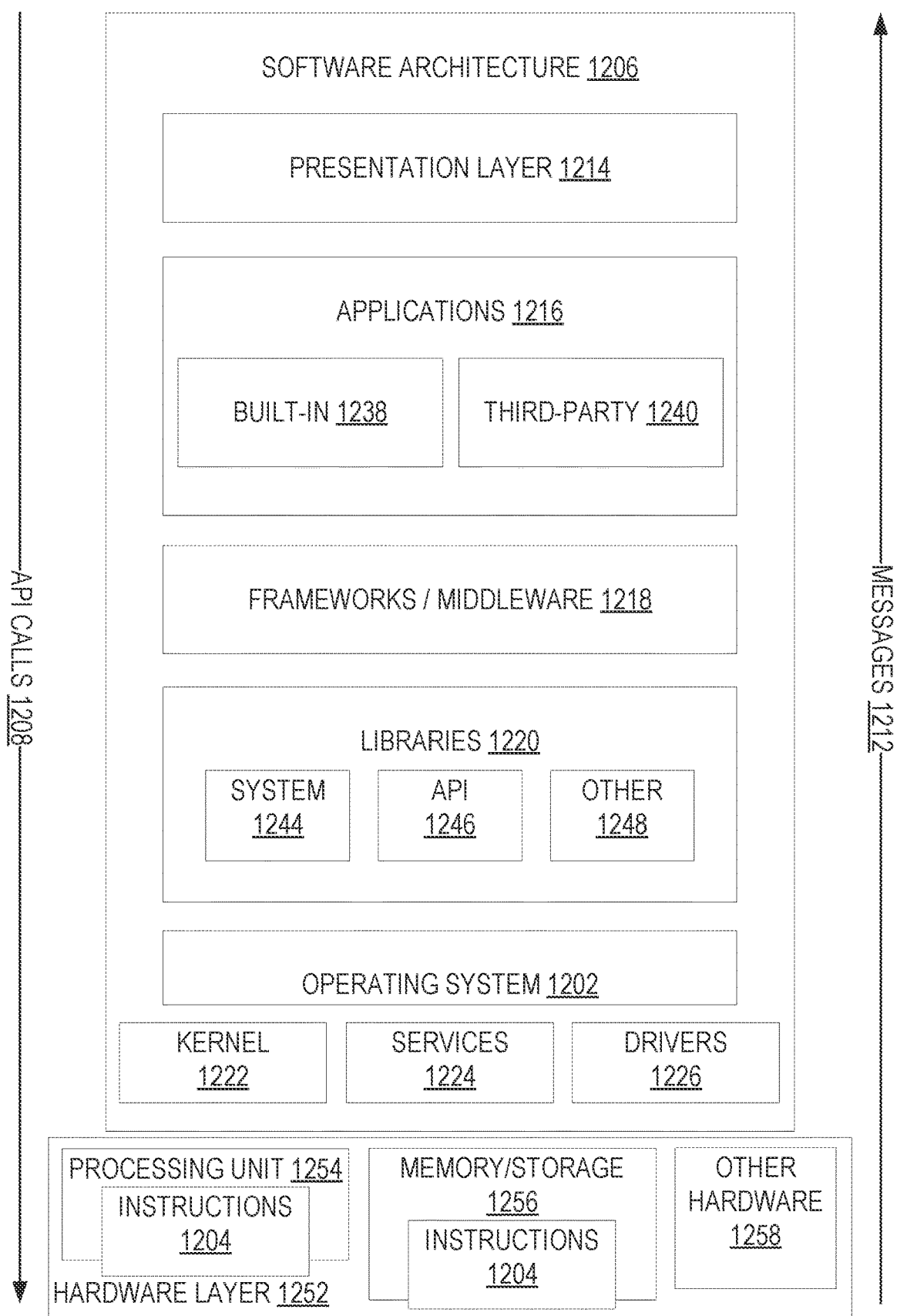
FIG. 12 is a block diagram illustrating a representative software architecture, which may be used in conjunction with various hardware architectures herein described, according to example embodiments.

FIG. 12 is a block diagram illustrating an example software architecture 1206, which may be used in conjunction with various hardware architectures herein described. FIG. 12 is a non-limiting example of a software architecture and it will be appreciated that many other architectures may be implemented to facilitate the functionality described herein. The software architecture 1206 may execute on hardware such as machine 1300 of FIG. 13 that includes, among other things, processors 1304, memory 1314, and input/output (I/O) components 1318. A representative hardware layer 1252 is illustrated and can represent, for example, the machine 1300 of FIG. 13. The representative hardware layer 1252 includes a processing unit 1254 having associated executable instructions 1204. Executable instructions 1204 represent the executable instructions of the software architecture 1206, including implementation of the methods, components, and so forth described herein. The hardware layer 1252 also includes memory and/or storage modules memory/storage 1256, which also have executable instructions 1204. The hardware layer 1252 may also comprise other hardware 1258.

In the example architecture of FIG. 12, the software architecture 1206 may be conceptualized as a stack of layers where each layer provides particular functionality. For example, the software architecture 1206 may include layers such as an operating system 1202, libraries 1220, applications 1216, frameworks/middleware 1218, and a presentation layer 1214, Operationally, the applications 1216 and/or other components within the layers may invoke. APT calls 1208 through the software stack and receive messages 1212 in response to the APT calls 1208. The layers illustrated are representative in nature and not all software architectures have all layers. For example, some mobile or special purpose operating systems may not provide a frameworks/middleware 1218, while others may provide such a layer. Other software architectures may include additional or different layers.

The operating system 1202 may manage hardware resources and provide common services. The operating system 1202 may include, for example, a kernel 1222, services 1224, and drivers 1226. The kernel 1222 may act as an abstraction layer between the hardware and the other software layers. For example, the kernel 1222 may be responsible for memory management, processor management (e.g., scheduling), component management, networking, security settings, and so on. The services 1224 may provide other common services for the other software layers. The drivers 1226 are responsible for controlling or interfacing with the underlying hardware. For instance, the drivers 1226 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1220 provide a common infrastructure that is used by the applications 1216 and/or other components and/or layers. The libraries 1220 provide functionality that allows other software components to perform tasks in an easier fashion than to interface directly with the underlying operating system 1202 functionality (e.g., kernel 1222, services 1224 and/or drivers 1226). The libraries 1220 may include system libraries 1244 (e.g., C standard library) that may provide functions such as memory allocation functions, string manipulation functions, mathematical functions, and the like. In addition, the libraries 1220 may include API libraries 1246 such as media libraries (e.g., libraries to support presentation and manipulation of various media format such as MPREG4, H.264, MP3, AAC, AMR, JPG, PNG), graphics libraries (e.g., an OpenGL, framework that may be used to render two-dimensional and three-dimensional in a graphic content on a display), database libraries (e.g., SQLite that may provide various relational database functions), web libraries (e.g., WebKit that may provide web browsing functionality), and the like. The libraries 1220 may also include a wide variety of other libraries 1248 to provide many other APIs to the applications 1216 and other software components/modules.

The frameworks/middleware 1218 (also sometimes referred to as middleware) provide a higher-level common infrastructure that may be used by the applications 1216 and/or other software components/modules. For example, the frameworks/middleware 1218 may provide various graphic user interface (GUI) functions, high-level resource management, high-level location services, and so forth. The frameworks/middleware 1218 may provide a broad spectrum of other APIs that may be utilized by the applications 1216 and/or other software components/modules, some of which may be specific to a particular operating system 1202 or platform.

The applications 1216 include built-in applications 1238 and/or third-party applications 1240. Examples of representative built-in applications 1238 may include, but are not limited to, a contacts application, a browser application, a book reader application, a location application, a media application, a messaging application, and/or a game application. Third-party applications 1240 may include an application developed using the ANDROID™ or IOS® software development kit (SDK) by an entity other than the vendor of the particular platform, and may be mobile software running on a mobile operating system such as IOS™, ANDROID™, WINDOWS® Phone, or other mobile operating systems. The third-party applications 1240 may invoke the API calls 1208 provided by the mobile operating system (such as operating system 1202) to facilitate functionality described herein.

The applications 1216 may use built-in operating system functions (e.g., kernel 1222, services 1224, and/or drivers 1226), libraries 1220, and frameworks/middleware 1218 to create user interfaces to interact with users of the system. Alternatively, or additionally, in some systems interactions with a user may occur through a presentation layer, such as presentation layer 1214. In these systems, the application/component "logic" can be separated from the aspects of the application/component that interact with a user.

Figure 13:
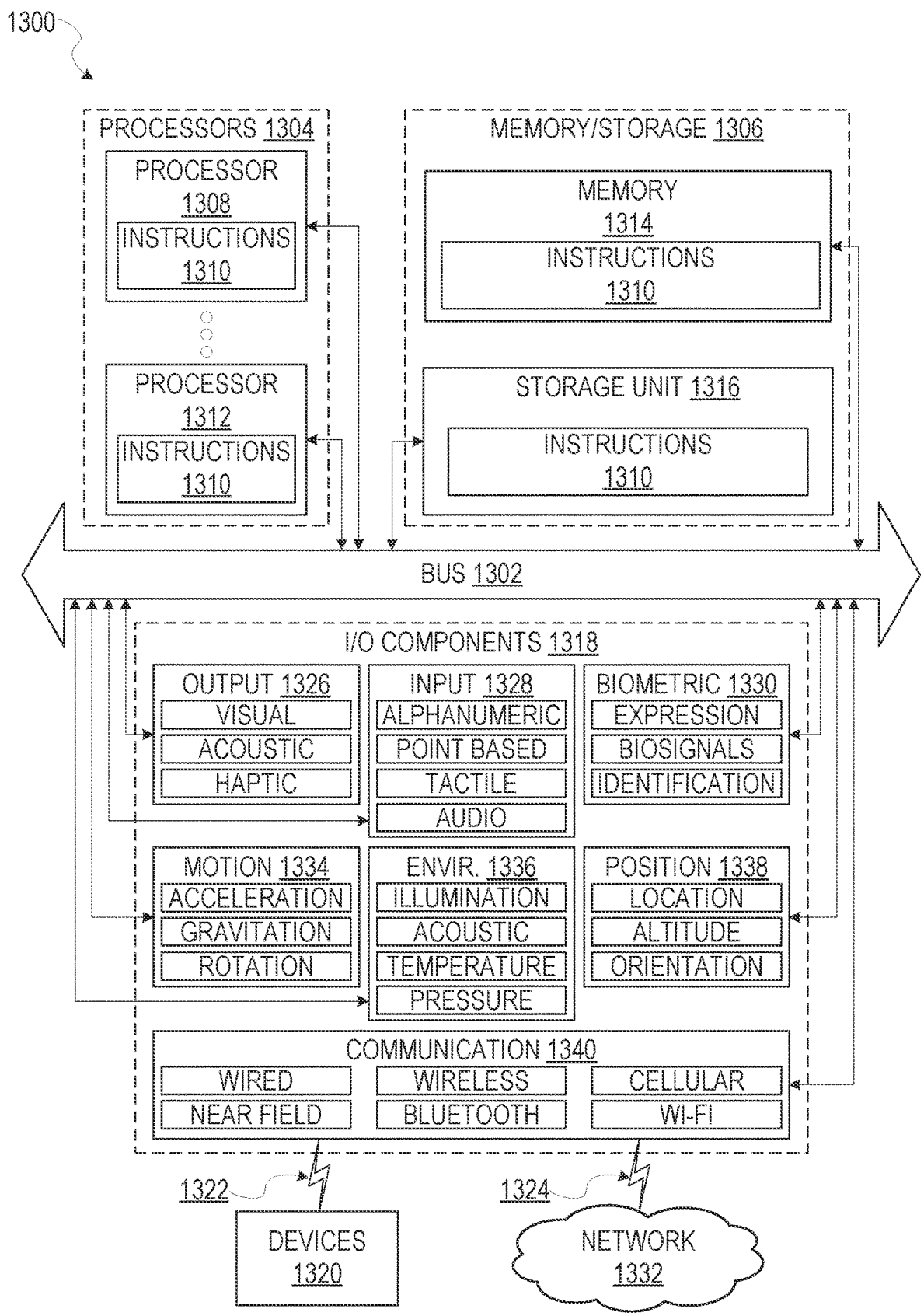
FIG. 13 is a block diagram illustrating components of a machine able to read instructions from a machine-readable medium (e.g., a machine-readable storage medium) and perform any one or more of the methodologies discussed herein, according to example embodiments.

FIG. 13 is a block diagram illustrating components of a machine 1300, according to some example embodiments, able to read instructions from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1310 (e.g., software, a program, an application, an applet, an app, or other executable code) for causing the machine 1300 to perform any one or more of the methodologies discussed herein may be executed. As such, the instructions 1310 may be used to implement modules or components described herein. The instructions 1310 transform the general, non-programmed machine 1300 into a particular machine 1300 programmed to carry out the described and illustrated functions in the manner described. In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (SIB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1310, sequentially or otherwise, that specify actions to be taken by machine 1300. Further, while only a single machine 1300 is illustrated, the term "machine" shall also be taken to include a collection of machines that individually or jointly execute the instructions 1310 to perform any one or more of the methodologies discussed herein.

The machine 1300 may include processors 1304, memory memory/storage 1306, and I/O components 1318, which may be configured to communicate with each other such as via a bus 1302. In an example embodiment, the processors 1304 (e.g., a central processing unit (CPU), a reduced instruction set computing (RISC) processor, a complex instruction set computing (CNC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1308 and a processor 1312 that may execute the instructions 1310. The term "processor" is intended to include multi-core processors 1304 that may comprise two or more independent processors (sometimes referred to as "cores") that may execute instructions contemporaneously. Although FIG. 13 shows multiple processors 1304, the machine 1300 may include a single processor with a single core, a single processor with multiple cores (e.g., a multi-core processor), multiple processors with a single core, multiple processors with multiple cores, or any combination thereof.

The memory/storage 1306 may include a memory 1314, such as a main memory, or other memory storage, and a storage unit 1316, both accessible to the processors 1304 such as via the bus 1302. The storage unit 1316 and memory 1314 store the instructions 1310 embodying any one or more of the methodologies or functions described herein. The instructions 1310 may also reside, completely or partially, within the memory 1314, within the storage unit 1316, within at least one of the processors 1304 (e.g., within the processor's cache memory), or any suitable combination thereof, during execution thereof by the machine 1300. Accordingly, the memory 1314, the storage unit 1316, and the memory of processors 1304 are examples of machine-readable media.

The I/O components 1318 may include a wide variety of components to receive input, provide output, produce output, transmit information, exchange information, capture measurements, and so on. The specific I/O components 1318 that are included in a particular machine 1300 will depend on the type of machine. For example, portable machines such as mobile phones will likely include a touch input device or other such input mechanisms, while a headless server machine will likely not include such a touch input device, it will be appreciated that the I/O components 1318 may include many other components that are not shown in FIG. 13. The I/O components 1318 are grouped according to functionality merely for simplifying the following discussion and the grouping is in no way limiting. In various example embodiments, the I/O components 1318 may include output components 1326 and input components 1328. The output components 1326 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1328 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1318 may include biometric components 1330, motion components 1334, environmental components 1336, or position components 1338 among a wide array of other components. For example, the biometric components 1330 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1334 may include acceleration sensor components (e.g., accelerometer), gravitation sensor components, rotation sensor components (e.g., gyroscope), and so forth. The environment components 1336 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1338 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1318 may include communication components 1340 operable to couple the machine 1300 to a network 1332 or devices 1320 via coupling 1324 and coupling 1322, respectively. For example, the communication components 1340 may include a network interface component or other suitable device to interface with the network 1332. In further examples, communication components 1340 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1320 may be another machine or any of a wide variety of peripheral devices (e.g., a peripheral device coupled via a USB).

Moreover, the communication components 1340 may detect identifiers or include components operable to detect identifiers. For example, the communication components 1340 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1340, such as, location via Internet Protocol (JP) geo-location, location via Wi-Fi® signal triangulation, location via detecting a NEC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, extranet, a virtual private network (VPN), a local area network (LAN), a wireless LAN (WLAN), a wide area network (WAN), a \wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide interoperability for Microwave Access (WiMAX), Long Term Evolution (LTE) standard, others defined by various standard setting organizations, other long range protocols, or other data transfer technology.

"EPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions, Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a stand-alone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc) and which produces corresponding output signals that are applied to operate a machine. A processor may, for example, be a. Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

What is claimed is:

1. A method comprising:
    capturing, during a time period defined by a start and end points of a recording session, using a camera-enabled device, video content of a real-world scene;
    storing the video content captured during the time period;
    at a second time point that is after the time period during which the video content is captured:
        playing back the video content;
        during playback of the video content, detecting input that presses on an individual frame of the video content being played back for a threshold period of time, the individual frame corresponding to a paused play position;
        in response to detecting the input that presses on the individual frame of the video content for a threshold period of time, pausing playback of the video content;
        while the video content is paused on the individual frame, receiving a request to augment the stored captured video content with a virtual object; and
        adding the virtual object to a first frame of the video content that has been captured instead of the individual frame of the video content corresponding to the paused play position to create augmented video content comprising the real-world scene and the virtual object;
    temporarily increasing a size of the virtual object in response to receiving a first type of input that presses and holds the virtual object to enable manipulation of the virtual object in two-dimensional (2D) space;
    modifying 2D placement of the virtual object within a portion of the video content based on one or more inputs; and
    modifying an appearance of the virtual object in response to receiving a second type of input to enable manipulation of the virtual object in three-dimensional space.

2. The method of claim 1, further comprising:
    capturing movement information collected by the camera-enabled device during capture of the video content;
    storing the movement information comprising a plurality of inertial measurement unit (IMU) frames associated with respective timestamps;
    processing the stored captured video content to identify a real-world object in the scene;
    after the video content is captured, in response to receiving a request to augment the stored captured video content with a virtual object:
    retrieving the plurality of IMU frames associated with the stored captured video content; and
    matching the plurality of IMU frames with the stored captured video content by correlating the timestamps of one or more of the plurality of IMU frames with a timestamp of a frame of the stored captured video content;
    generating an interactive augmented reality display; and
    adjusting, during playback of the augmented video content, an on-screen position of the virtual object within the augmented video content based at least in part on matching the plurality of IMU frames with the stored captured video content.

3. The method of claim 1, further comprising:
    determining that the camera-enabled device is associated with a first classification of a plurality of classifications; and
    in response to determining that camera-enabled device is associated with the first classification, storing a first set of IMU information, wherein a second set of IMU information is stored for devices associated with a second classification of the plurality of classifications, wherein motion information represented by the second set of IMU information is of a different type and quality than motion information represented by the first set of IMU information, the first set of IMU information comprising preprocessed device motion data and the second set of IMU information comprising raw IMU data.

4. The method of claim 3, wherein the second set of IMU information comprise an orientation matrix of the camera-enabled device, raw accelerometer information for the camera-enabled device, and gyroscope information for the camera-enabled device, and wherein:
    the virtual object comprises a virtual three-dimensional object; and
    adding the virtual object comprises attaching the virtual three-dimensional object to the real-world object.

5. The method of claim 1, wherein adding the virtual object comprises:
    determining that a position of the camera-enabled device has moved during capture of the video content resulting in the real-world object being moved from a first position to a second position on a screen during playback of the video content; and
    maintaining the position of the virtual three-dimensional object in fixed association with a position of the real-world object by moving the position of the virtual three-dimensional object from a third position to a fourth position on the screen as the real-world object moves from the first position to the second position during playback.

6. The method of claim 1, wherein adding the virtual object comprises:
- determining, based on an image analysis of the video content, that a real-world position of the real-world object has moved during capture of the video from a first position to a second position while the camera remained in a fixed position; and
- maintaining the position of the virtual three-dimensional object in fixed association with a position of the real-world object by moving the position of the virtual three-dimensional object on a screen from a third position to a fourth position as the real-world object moves from the first position to the second position during playback.

7. The method of claim 1 further comprising:
- displaying a plurality of icons representing virtual objects while the video content plays;
- receiving a user selection of the virtual object from the plurality of icons while the video content plays;
- in response to receiving the user selection:
- pausing the stored video content at a given frame; and
- performing the adding of the virtual object to the given frame.

8. The method of claim 7 further comprising resuming playback of the augmented video content in response to determining that further user input has not been received after selection of the virtual object after a given time interval.

9. The method of claim 1 further comprising:
- determining that the virtual object overlaps boundaries of first and second real-world objects depicted in the video content;
- computing an overlap amount of each boundary of the first and second real-world objects that the virtual object overlaps;
- determining that the overlap amount of the second real-world object exceeds the overlap amount of the first real-world object; and
- in response to determining that the overlap amount of the second real-world object exceeds the overlap amount of the first real-world object, selecting the second real-world object as a target real-world object to track.

10. The method of claim 9 further comprising:
- attaching the virtual object to the target real-world object in response to receiving a user input that presses and holds the virtual object on a given frame for a threshold amount of time; and
- attaching the virtual object to a second real-world object in response to:
- receiving a first user input that touches the virtual object; and
- receiving, within the threshold amount of time, a second user input that drags the virtual object to a position of the second real-world object.

11. The method of claim 10 further comprising presenting a grid underneath the virtual object in response to receiving the second user input.

12. The method of claim 1, wherein adding the virtual object to the real-world scene in the stored captured video content comprises presenting a plurality of icons each having a circular ground shadow positioned relative to the respective icon and receiving a user selection of one of the icons.

13. The method of claim 1 further comprising replacing the virtual object with another virtual object in response to receiving a user selection of the another virtual object, wherein the another virtual object retains properties of the virtual object that is replaced and is attached to a same real-world object to which the virtual object that is replaced was attached.

14. The method of claim 1 further comprising modifying a visual attribute of the virtual object after the virtual object is added to the real-world scene.

15. The method of claim 1, further comprising automatically rewinding the augmented video content at a predetermined rate to a beginning of the augmented video content after adding the virtual object to the stored captured video content that has been paused.

16. A system comprising:
- a processor configured to perform operations comprising:
- capturing, during a time period defined by a start and end points of a recording session, using a camera-enabled device, video content of a real-world scene;
- storing the video content captured during the time period;
- at a second time point that is after the time period during which the video content is captured:
- playing back the video content;
- during playback of the video content, detecting input that presses on an individual frame of the video content being played back for a threshold period of time, the individual frame corresponding to a paused play position;
- in response to detecting the input that presses on the individual frame of the video content for a threshold period of time, pausing playback of the video content;
- while the video content is paused on the individual frame, receiving a request to augment the stored captured video content with a virtual object; and
- adding the virtual object to a first frame of the video content that has been captured instead of the individual frame of the video content corresponding to the paused play position to create augmented video content comprising the real-world scene and the virtual object;
- temporarily increasing a size of the virtual object in response to receiving a first type of input that presses and holds the virtual object to enable manipulation of the virtual object in two-dimensional (2D) space;
- modifying 2D placement of the virtual object within a portion of the video content based on one or more inputs; and
- modifying an appearance of the virtual object in response to receiving a second type of input to enable manipulation of the virtual object in three-dimensional space.

17. The system of claim 16, wherein the processor is further configured to perform operations comprising:
- capturing movement information collected by the camera-enabled device during capture of the video content;
- storing the movement information comprising a plurality of inertial measurement unit (IMU) frames associated with respective timestamps;
- processing the stored captured video content to identify a real-world object in the scene;
- after the video content is captured, in response to receiving a request to augment the stored captured video content with a virtual object:
- retrieving the plurality of IMU frames associated with the stored captured video content; and
- matching the plurality of IMU frames with the stored captured video content by correlating the timestamps of one or more of the plurality of IMU frames with a timestamp of a frame of the stored captured video content;
- generating an interactive augmented reality display; and adjusting, during playback of the augmented video content, an on-screen position of the virtual object within the augmented video content based at least in part on matching the plurality of IMU frames with the stored captured video content.

18. The system of claim 16, wherein the processor is further configured to perform operations comprising:
determining that the virtual object overlaps boundaries of first and second real-world objects depicted in the video content;
computing an overlap amount of each boundary of the first and second real-world objects that the virtual object overlaps;
determining that the overlap amount of the second real-world object exceeds the overlap amount of the first real-world object; and
in response to determining that the overlap amount of the second real-world object exceeds the overlap amount of the first real-world object, selecting the second real-world object as a target real-world object to track.

19. A non-transitory machine-readable storage medium including an augmented reality system that includes instructions that, when executed by one or more processors of a machine, cause the machine to perform operations comprising:
capturing, during a time period defined by a start and end points of a recording session, using a camera-enabled device, video content of a real-world scene;
storing the video content captured during the time period;
at a second time point that is after the time period during which the video content is captured:
playing back the video content;
during playback of the video content, detecting input that presses on an individual frame of the video content being played back for a threshold period of time, the individual frame corresponding to a paused play position;
in response to detecting the input that presses on the individual frame of the video content for a threshold period of time, pausing playback of the video content;
while the video content is paused on the individual frame, receiving a request to augment the stored captured video content with a virtual object; and adding the virtual object to a first frame of the video content that has been captured instead of the individual frame of the video content corresponding to the paused play position to create augmented video content comprising the real-world scene and the virtual object;
temporarily increasing a size of the virtual object in response to receiving a first type of input that presses and holds the virtual object to enable manipulation of the virtual object in two-dimensional (2D) space;
modifying 2D placement of the virtual object within a portion of the video content based on one or more inputs; and
modifying an appearance of the virtual object in response to receiving a second type of input to enable manipulation of the virtual object in three-dimensional space.

20. The non-transitory machine-readable storage medium of claim 19, wherein the operations further comprise:
capturing movement information collected by the camera-enabled device during capture of the video content;
storing the movement information comprising a plurality of inertial measurement unit (IMU) frames associated with respective timestamps;
processing the stored captured video content to identify a real-world object in the scene;
after the video content is captured, in response to receiving a request to augment the stored captured video content with a virtual object:
retrieving the plurality of IMU frames associated with the stored captured video content; and
matching the plurality of IMU frames with the stored captured video content by correlating the timestamps of one or more of the plurality of IMU frames with a timestamp of a frame of the stored captured video content;
generating an interactive augmented reality display; and
adjusting, during playback of the augmented video content, an on-screen position of the virtual object within the augmented video content based at least in part on matching the plurality of IMU frames with the stored captured video content.

* * * * *

UNITED STATES PATENT AND TRADEMARK OFFICE
CERTIFICATE OF CORRECTION

PATENT NO. : 11,715,268 B2
APPLICATION NO. : 17/307354
DATED : August 1, 2023
INVENTOR(S) : Hare et al.

Page 1 of 1

It is certified that error appears in the above-identified patent and that said Letters Patent is hereby corrected as shown below:

On the Title Page

In item (57), in "Abstract", in Column 2, Line 14, delete "object" and insert --object;-- therefor On page 3, in Column 1, under "U.S. Patent Documents", Line 32, delete "2005/0020661" and insert --2005/0206610-- therefor On page 3, in Column 2, under "U.S. Patent Documents", Line 21, delete "2014/0026741" and insert --2014/0267410-- therefor On page 4, in Column 2, under "Other Publications", Line 15, delete "16/242,708," and insert --15/863,575,-- therefor On page 5, in Column 2, under "Other Publications", Line 20, delete "Ciass"," and insert --Class",-- therefor On page 7, in Column 2, under "Other Publications", Line 2, delete "toOffice" and insert --to Office-- therefor Signed and Sealed this
Twenty-fourth Day of June, 2025

Coke Morgan Stewart
*Acting Director of the United States Patent and Trademark Office*